US006915096B2

(12) United States Patent
Taka et al.

(10) Patent No.: US 6,915,096 B2
(45) Date of Patent: Jul. 5, 2005

(54) IMAGE ADJUSTMENT METHOD AND IMAGE FORMING APPARATUS

(75) Inventors: Kyosuke Taka, Nara (JP); Yoshikazu Harada, Nara (JP); Norio Tomita, Yamatokooriyama (JP); Nobuo Manabe, Yamatokooriyama (JP); Takaharu Motoyama, Kashihara (JP); Ayumu Oda, Nara (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 10/660,812

(22) Filed: Sep. 12, 2003

(65) Prior Publication Data

US 2004/0057756 A1 Mar. 25, 2004

(30) Foreign Application Priority Data

Sep. 25, 2002 (JP) ...................................... 2002-279888

(51) Int. Cl.[7] ........................ G03G 15/01; G03G 15/00; B41J 2/385; G01D 15/06

(52) U.S. Cl. ........................... 399/301; 347/116; 399/9

(58) Field of Search ................................ 399/9, 37, 39, 399/40, 49, 88, 298, 299, 301; 347/115, 116

(56) References Cited

U.S. PATENT DOCUMENTS

| | | | | |
|---|---|---|---|---|
| 5,740,492 A | * | 4/1998 | Deki et al. | 399/301 X |
| 6,148,168 A | | 11/2000 | Hirai et al. | 399/301 |
| 6,529,616 B1 | * | 3/2003 | Rasmussen et al. | 347/116 X |
| 6,687,472 B2 | * | 2/2004 | Udaka et al. | 399/49 |

FOREIGN PATENT DOCUMENTS

| | | |
|---|---|---|
| JP | 10-213940 | 8/1998 |
| JP | 2000-081744 | 3/2000 |

* cited by examiner

*Primary Examiner*—Sandra L. Brase
(74) *Attorney, Agent, or Firm*—David G. Conlin; David A. Tucker; Edwards & Angell, LLP

(57) ABSTRACT

When an instruction to execute a color registration adjustment process is given (S1), an image forming apparatus deactivates a sheet feed driving section and a fixing unit (S2), stops communications with external devices (S3), invalidates control sensors excluding an operation section, a door sensor, and sensors involved in formation of images for adjustment (S4), stops a fan (S5), and then executes the color registration adjustment process by forming reference lines and correction lines on a transfer belt and detecting misregistration between them (S6). With this image adjustment method, it is possible to reduce wasteful consumption of developer and efficiently execute the color registration adjustment in a short period of time.

17 Claims, 14 Drawing Sheets

IMAGE ADJUSTMENT METHOD AND IMAGE FORMING APPARATUS

BACKGROUND OF THE INVENTION

1. Field of the Invention

The present invention relates to an image adjustment method and an image forming apparatus of electrophotographic type, and more specifically relates to an image adjustment method and an image forming apparatus capable of automatically adjusting misregistration of a multi-color image, which is caused when forming the multi-color image by superimposing a plurality of color component images on a recording carrier.

2. Description of Related Art

In an image forming apparatus such as a digital color copying machine and a digital color printer, after decomposing inputted data into respective color components and performing image processing, images of the respective color components are superimposed to form a multi-color image. If the respective color component images are not accurately superimposed during the formation of a multi-color image, misregistration occurs in the resultant multi-color image, and image quality deteriorates. In particular, in an image forming apparatus comprising an image forming section for each color component so as to improve the formation speed of a multi-color image, the multi-color image is formed by forming respective color component images in the respective image forming sections and superimposing the respective color component images one upon another. In such an image forming apparatus, there tend to be differences among the transfer positions of the respective color component images, and consequently there arises a serious problem of misregistration of the multi-color image.

Therefore, in order to accurately superimpose the respective color component images, the image forming apparatus performs color registration adjustment for correcting the misregistration of a multi-color image, so that a satisfactory multi-color image having no misregistration is formed. The color registration adjustment is usually carried out by using an optical detector to detect the displacement of the image forming positions of other color components with respect to the image forming position of a color component to be the reference. Next, a correction amount is determined based on the result of the detection, and then, according to the correction amount, the timing of forming respective color component images is adjusted so that the transfer positions of the respective color component images agree with each other. In general, in order to determine a correction amount, the respective color component images are transferred at the same timing and the distance between the transfer positions of the respective color components is detected, or the density of a multi-color image formed by superimposing the respective color components is measured.

For example, in an image forming apparatus disclosed in Japanese Patent Application Laid-Open No. 10-213940 (1998), the distance between the transfer positions of the respective color component images is detected, and a correction is made based on the detected amount of displacement between the transfer positions. In this image forming apparatus, the distance between an image formed by a color component to be the reference and images formed by other color components is detected with a detector, the amount of displacement between the transfer positions of the respective color component images is determined based on the detected distance, and the misregistration is corrected.

Further, Japanese Patent Application Laid-Open No. 2000-81744 discloses an image forming apparatus which measures the density of a multi-color image formed by superimposing respective color component images, and corrects misregistration so that the measured density becomes equal to a density which is obtained when the respective color component images are accurately superimposed. In this image forming apparatus, in order to improve the correction accuracy, a plurality of same images of each color component are repeatedly formed. According to the above publication, a plurality of line images are formed as the same images, and the density of a multi-color line image is detected with a detector so as to find the superimposed state of the respective color component line images. Then, a state in which the density of the multi-color line image detected with the detector is within a predetermined density range is regarded as a state in which the respective color component line images are accurately superimposed, and a correction is made so that image formation is performed in this superimposed state, thereby performing the color registration adjustment.

Thus, when performing the color registration adjustment by measuring the position or the density of the formed image and detecting the positional relation of a color image subjected to correction with respect to a color image to be the reference, the image forming apparatus disclosed in Japanese Patent Application Laid-Open No. 10-213940 (1998) does not need to form a large number of line images since it detects the position of the line images. Whereas, in the image forming apparatus disclosed in Japanese Patent Application Laid-Open No. 2000-81744 in which a plurality of line images are formed and the density of a multi-color line image is detected with a detector so as to find the superimposed state of the respective color component line images, the number of respective color component line images to be formed is influenced by the sampling cycle of the detector. If the sampling cycle is short, the number of line images to be formed can be reduced. Whereas, if the sampling cycle is long, the number of line images to be formed must be increased. The sampling cycle of the detector is set based on an operation clock of control means. Usually, this control means always monitors the input and output of detecting means or the like which is installed in the image forming apparatus to know the condition of the apparatus, and is in a standby state for signals from various kinds of detecting means or the like so that it can respond quickly to instructions from the outside. Therefore, the sampling cycle for detecting line images cannot be set short when executing the color registration adjustment, and consequently the number of line images to be formed increases. In addition, there is a problem that the adjustment time is longer. Further, in order to avoid taking a long time to make the adjustment, the number of samplings needs to be decreased, and thus there is a problem that highly accurate detection cannot be performed.

BRIEF SUMMARY OF THE INVENTION

The present invention has been made with the aim of solving the above-mentioned problems, and it is an object of the present invention to provide an image adjustment method and an image forming apparatus capable of shortening the sampling cycle for detecting line images, saving developer for forming the line images and executing color registration adjustment in a short period of time, by stopping monitoring input and output devices such as a detector which is not used for the color registration adjustment.

Another object of the present invention is to provide an image adjustment method and an image forming apparatus capable of increasing the number of samplings, achieving high detection accuracy, and thereby performing highly accurate adjustment.

An image adjustment method of the present invention of transferring a plurality of color component images by transfer means, detecting a superimposed state of the respective transferred color component images by image detecting means and adjusting an image transfer position, based on detected results, to correctly superimpose the respective color component images, comprises the steps of accepting information giving an instruction to detect a superimposed state of the respective color component images; starting the detection of a superimposed state of the respective color component images by controlling an operation of the image detecting means, upon acceptance of the information; and stopping operations other than control of the operation of the image detecting means and accepting of detection results of the image detecting means, when detecting the superimposed state.

According to the present invention, when transferring the respective color component images and detecting a superimposed state of these images, operations other than control of the operation of the image detecting means and accepting of detection results of the image detecting means are stopped. Accordingly, there is no need to control operations of members other than control means and sensors involved in the detection and adjustment of color component images, and therefore the detection and adjustment of color component images can be intensively controlled. As a result, it becomes possible to shorten the adjustment time. Moreover, since the detection of color component images can be intensively controlled, it is possible to shorten the detection cycle and enable highly accurate adjustment.

An image forming apparatus of the present invention comprises a housing capable of being opened and closed, and forms an image by superimposing a plurality of color component images by separately transferring each color component image. The image forming apparatus further comprises: accepting means for accepting information giving an instruction to detect a superimposed state of the respective color component images; image detecting means for detecting a superimposed state of the respective transferred color component images; control means for controlling an operation of the image detecting means; and open/close detecting means for detecting opening and closing of the housing. When the accepting means accepts the information, operations other than control of the operation of the image detecting means by the control means, accepting of detection results of the image detecting means and accepting of detection results of the open/close detecting means are stopped.

According to the present invention, when transferring the respective color component images and detecting a superimposed state of the images, operations other than control of the operation of the image detecting means, accepting of detection results of the image detecting means and accepting of detection results involved in opening and closing of the housing are stopped. Accordingly, there is no need to control operations of members other than the control means and sensors involved in the detection and adjustment of color component images, and therefore the detection and adjustment of color component images can be intensively controlled. As a result, it becomes possible to shorten the adjustment time. Moreover, since the detection of color component images can be intensively controlled, it is possible to shorten the detection cycle and enable highly accurate adjustment.

In the image forming apparatus of the present invention, the image detecting means may detect a superimposed state of respective color component images on a predetermined cycle.

According to the present invention, since a superimposed state of respective color component images is detected on a predetermined cycle, it is possible to highly accurately detect an image for detection and highly accurately detect the superimposed state of the respective color component images by setting the cycle to be short. Besides, when the detection cycle is short, since the amount of color component images to be formed for adjustment can be reduced, it is possible to save the developer and shorten the adjustment time.

The image forming apparatus of the present invention may further comprise: fixing means for fixing the respective transferred color component images onto a recording carrier; and means for supplying power to the fixing means. When transferring the respective color component images and detecting a superimposed state of the images, the supply of power to the fixing means is stopped.

According to the present invention, when detecting a superimposed state of the respective color component images, it is not necessary to fix the transferred color component images. Therefore, by stopping the supply of power to the fixing means, it is possible to reduce the consumption of power and prevent a rise in the temperature in the vicinity of the fixing means. Moreover, since there is no need to control the operation of the fixing means, the detection of the superimposed state of the respective color component images can be intensively performed. Furthermore, for example, by shortening the detection cycle, it is possible to perform highly accurate detection.

The image forming apparatus of the present invention may further comprise: cooling means provided to lower the temperature around the fixing means; and means for supplying power to the cooling means. When transferring the respective color component images and detecting a superimposed state of the images, the supply of power to the cooling means is stopped.

The present invention comprises cooling means such as a cooling fan and a ventilation fan provided to lower the temperature around the fixing means, and stops the supply of power to the cooling means when transferring images for detection and detecting a superimposed state of the respective color component images. When the supply of power to the fixing means is stopped, the temperature in the image forming apparatus tends to fall, and therefore it is possible to stop the supply of power to the cooling means. Moreover, by stopping the supply of power to the cooling means, it is possible to reduce power consumption and intensively detect the superimposed state of the respective color components.

The image forming apparatus of the present invention may further comprise means for performing control to stop the supply of power to the cooling means after stopping the supply of power to the fixing means when transferring the respective color components and detecting the superimposed state of the images.

In the present invention, the supply of power to the cooling means is stopped after stopping the supply of power to the fixing means. It is therefore possible to prevent a temporary rise in the temperature due to the stopping of the supply of power to the cooling means.

The above and further objects and features of the invention will more fully be apparent from the following detailed description with accompanying drawings.

DETAILED DESCRIPTION OF THE INVENTION

The following description will explain the present invention in detail based on the drawings illustrating an embodiment thereof.

Figure 1:
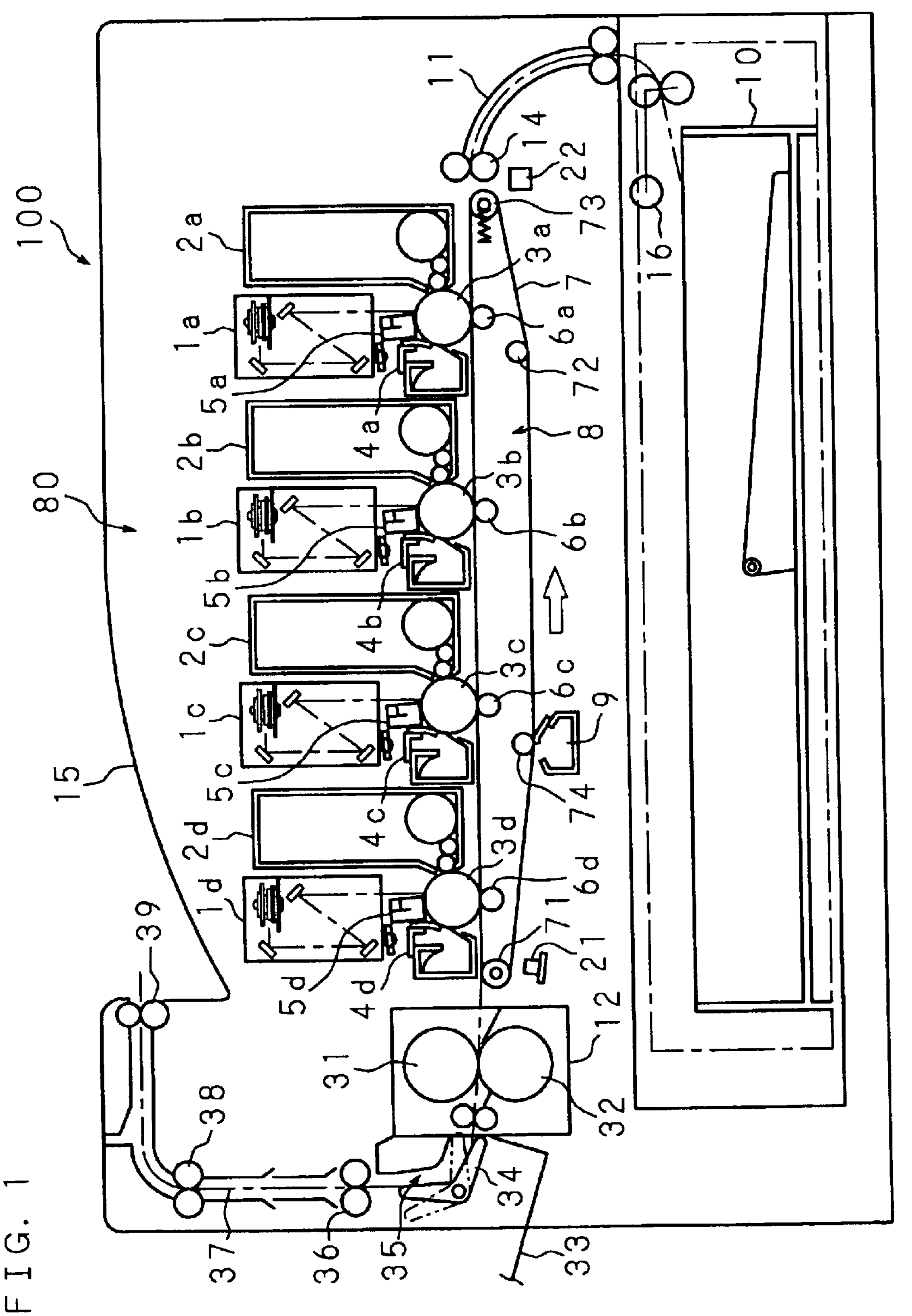
FIG. 1 is a cross sectional view showing the entire configuration of an image forming apparatus of the present invention.

FIG. 1 is a cross-sectional view showing the entire configuration of an image forming apparatus of the present invention. The numeral 100 in FIG. 1 represents an image forming apparatus of the present invention, and more specifically a digital color printer, a digital color copying machine, or a composite machine thereof As shown in FIG. 1, the image forming apparatus 100 comprises an image forming station 80, a transfer and transport belt unit 8, a registration detecting sensor 21, and a temperature and humidity sensor 22.

In order to form a multi-color image using colors of black (K), cyan (C), magenta (M) and yellow (Y), the image forming station 80 of the image forming apparatus 100 comprises light exposure units 1*a,* 1*b,* 1*c* and 1*d* for forming four kinds of latent images corresponding to the respective colors; developing devices 2*a,* 2*b,* 2*c* and 2*d* for developing the latent images of the respective colors; photoconductor drums 3*a,* 3*b,* 3*c* and 3*d;* cleaner units 4*a,* 4*b,* 4*c* and 4*d;* and charging devices 5*a,* 5*b,* 5*c* and 5*d.* Note that the letters "a", "b", "c" and "d" added to the reference numerals respectively correspond to black (K), cyan (C), magenta (M) and yellow (Y).

The light exposure units 1*a*, 1*b*, 1*c* and 1*d* are a laser scanning units (LSU) each comprising: a write bead composed of light emitting elements, such as El (Electro Luminescence) and LED (Light Emitting Diode), arranged in an array, or a laser irradiation section; and a reflective mirror. The LSU is used in the image forming apparatus 100 shown in FIG. 1. The light exposure units 1*a* to 1*d* each forms an electrostatic latent image corresponding to the inputted image data on a corresponding photoconductor drum 3*a*, 3*b*, 3*c* or 3*d* by performing exposure according to the image data.

Developing devices 2*a*, 2*b*, 2*c* and 2*d* develops the electrostatic latent image formed on the corresponding photoconductor drums 3*a* to 3*d* into visible images with toner of the respective colors. The photoconductor drums 3*a* to 3*d* are disposed in the center of the image forming apparatus 100. The electrostatic latent image or the toner image corresponding to the inputted image data is formed on the surface of the photoconductor drums 3*a* to 3*d*. After developing and transferring, the electrostatic latent images formed on the surfaces of the photoconductor drums 3*a* to 3*d*, the cleaner units 4*a*, 4*b*, 4*c* and 4*d* removes and collects the toner remaining on the photoconductor drums 3*a* to 3*d.*

Charging devices 5*a*, 5*b*, 5*c* and 5*d* uniformly charges the surface of the corresponding photoconductor drums 3*a* to 3*d* to a predetermined potential. As the charging devices 5*a* to 5*d,* in addition to roller type charging devices or brush type charging devices which comes into contact with the photoconductor drums 3*a* to 3*d*, there is a possibility of using a charger type charging devices which do not come into contact with the photoconductor drums 3*a* to 3*d*. These charger type charging devices are used in the image forming apparatus 100 shown in FIG. 1.

The transfer and transport belt unit 8 is disposed under the photoconductor drums 3*a* to 3*d*. The transfer and transport belt unit 8 includes a transfer belt 7, a transfer belt driving roller 71, a transfer belt tension roller 73, transfer belt driven rollers 72 and 74, transfer rollers 6*a*, 6*b*, 6*c*, 6*d*, and a transfer belt cleaning unit 9.

The transfer belt driving roller 71, transfer belt tension roller 73, transfer rollers 6*a* to 6*d*, and transfer belt driven rollers 72 and 74 support the transfer belt 7 in a stretched manner, and drive and rotate the transfer belt 7 in the direction shown by an arrow relieved in white in FIG. 1.

The transfer rollers 6*a* to 6*d* are rotatably supported on the housing of the transfer and transport belt unit 8. Each of the transfer rollers 6*a* to 6*d* has a metal shaft with a diameter of 8 to 10 mm as a base, and a surface covered with a conductive elastic material such as EPDM (Ethylene Propylene Diene Monomer) or urethane foam. By using the conductive elastic material, the transfer rollers 6*a* to 6*d* can uniformly apply a high voltage of the polarity opposite to the charged polarity of the toner to a recording sheet and transfer the toner image formed on the photoconductor drums 3*a* to 3*d* to the transfer belt 7, or the recording sheet which is transported while being attracted onto the transfer belt 7.

The transfer belt 7 is made of an about 100 $\mu$m thick polycarbonate, polyimide, polyamide, polyvinylidene fluoride, polytetrafluoroethylene polymer, ethylene tetrafluoroethylene polymer or the like, and placed in contact with the photoconductor drums 3*a* to 3*d*. A multi-color toner image is formed by successively transferring the toner images of the respective colors formed on the photoconductor drums 3*a* to 3*d* onto the transfer belt 7, or the recording sheet which is transported while being attracted onto the transfer belt 7. The transfer belt 7 has a thickness of about 100 μm and is formed in endless form using a film.

The transfer belt cleaning unit 9 removes and collects toner for color registration adjustment and toner for process control which are directly transferred onto the transfer belt 7, and toner which adheres to the transfer belt 7 due to contact with the photoconductor drums 3*a* to 3*d*.

In order to detect the patch images formed on the transfer belt 7, the registration detecting sensor 21 is disposed at a position where the patch images on the rotating transfer belt 7 pass after passing through the image forming station 80 and before reaching the transfer belt cleaning unit 9. The registration detecting sensor 21 detects the density of the patch images formed on the transfer belt 7 in the image forming station. Here, the patch images formed on the transfer belt 7 are images used for color registration adjustment, and the detail thereof will be described later.

Moreover, in order to detect the temperature and humidity in the image forming apparatus 100, the temperature and humidity sensor 22 is disposed in the vicinity of a processing unit where there is no abrupt change in the temperature and humidity.

In the image forming station 80 of the image forming apparatus 100 having the above-mentioned structures, the light exposure units 1*a* to 1*d* performs exposure at a predetermined timing according to the inputted image data, thereby forming an electrostatic latent image on the coresponding photoconductor drums 3*a* to 3*d*. Next, the developing devices 2*a* to 2*d* develop the electrostatic latent images into toner images, and the toner images are transferred to the transfer belt 7, or the recording sheet which is transported while being attracted onto the transfer belt 7.

The transfer belt 7 is made of an about 100 μm thick polycarbonate, polyimide, polyamide, polyvinylidene fluoride, polytetrafluoroethylene polymer, ethylene tetrafluoroethylene polymer or the like, and placed in contact with the photoconductor drum 3. A multi-color toner image is formed by successively transferring the toner images of the respective colors formed on the photoconductor drums 3 onto the transfer belt 7, or the recording sheet which is transported while being attracted onto the transfer belt 7. The transfer belt 7 has a thickness of about 100 μm, and is formed in endless form using a film.

The transfer belt cleaning unit 9 removes and collects toner for color registration adjustment and toner for process control which are directly transferred onto the transfer belt 7, and toner which adheres to the transfer belt 7 due to contact with the photoconductor drums 3.

In order to detect the patch images formed on the transfer belt 7, the registration detecting sensor 21 is disposed at a position where the patch images on the rotating transfer belt 7 pass after passing through the image forming station 80 and before reaching the transfer belt cleaning unit 9. The registration detecting sensor 21 detects the density of the patch images formed on the transfer belt 7 in the image forming station. Here, the patch images formed on the transfer belt 7 are images used for color registration adjustment, and the detail thereof will be described later.

Moreover, in order to detect the temperature and humidity in the image forming apparatus 100, the temperature and humidity sensor 22 is disposed in the vicinity of a processing unit where there is no abrupt change in the temperature and humidity.

In the image forming station 80 of the image forming apparatus 100 having the above-mentioned structures, the light exposure unit 1 performs exposure at a predetermined timing according to the inputted image data, thereby forming an electrostatic latent image on the photoconductor drum 3. Next, the developing device 2 develops the electrostatic latent image into a toner image, and the toner image is transferred to the transfer belt 7, or the recording sheet which is transported while being attracted onto the transfer belt 7.

Since the transfer belt 7 is driven and rotated by the transfer belt driving roller 71, transfer belt tension roller 73, transfer belt driven rollers 72, 74 and transfer rollers 6, the respective color component toner images are successively transferred one upon another onto the transfer belt 7, or the recording sheet which is transported while being attracted onto the transfer belt 7, thereby forming a multi-color toner image. In the case where the multi-color toner image is formed on the transfer belt 7, this multi-color toner image is further transferred onto the recording sheet.

When performing the color registration adjustment in the image forming apparatus 100 of this embodiment, the respective color component toner images formed in the image forming station 80 are transferred onto the transfer belt 7. At this time, a color component toner image to be the reference (hereinafter referred to as the reference patch image) among the respective color component toner images is transferred onto the transfer belt 7, and then other color component toner image subjected to color misregistration correction (hereinafter referred to as the correction patch image) is transferred onto the reference patch image.

In addition to the structures involved in the color registration adjustment, the image forming apparatus 100 comprises a sheet feed tray 10, sheet discharge trays 15 and 33, and a fixing unit 12.

The sheet feed tray 10 is a tray for storing recording sheets for recording images. The sheet discharge trays 15 and 33 are trays on which recording sheets with images recorded thereon are placed. The sheet discharge tray 15 is disposed in the upper part of the image forming apparatus 100, and stores the printed recording sheets face down. The sheet discharge tray 33 is provided in a side part of the image forming apparatus 100, and stores the printed recording sheets face up.

The fixing unit 12 includes a heat roller 31 and a pressurization roller 32. The temperature of the heat roller 31 is controlled to a predetermined temperature by electrically turning on or off heating means such as a heater lamp, based on a temperature value detected by a temperature detector (see FIG. 3). The heat roller 31 and the pressurization roller 32 rotate while holding therebetween a recording sheet onto which a toner image has been transferred, and hot-press the toner image to the recording sheet with the heat of the heat roller 31.

The following description will explain the operations of the image forming apparatus 100 having the above-mentioned structures.

When image data are inputted into the image forming apparatus 100, the light exposure units 1*a* to 1*d* perform exposure according to the inputted image data on the basis of a correction value obtained by the color registration adjustment, so that electrostatic latent images are formed on the photoconductor drums 3*a* to 3*d*. This These electrostatic latent images are is developed into a toner images by the developing devices 2*a* to 2*d*. Meanwhile, one sheet of the recording sheets stored in the sheet feed tray 10 is separated by a pickup roller 16, transported to a sheet transport path 11, and temporarily held by resist rollers 14. Based on a detection signal of a registration pre-detection switch which is not illustrated in figures, the resist rollers 14 control the timing so that the leading end of the toner images on the photoconductor drums 3*a* to 3*d* are aligned with the leading end of the image formation region of the recording sheet, and transport the recording sheet to the transfer belt 7 in accordance with the rotation of the photoconductor drums 3*a* to 3*d*. The recording sheet is transported while being attracted onto the transfer belt 7.

The transfer of the toner images from the photoconductor drums 3*a* to 3*d* to the recording sheet is carried out by the transfer rollers 6*a* to 6*d* which are disposed to face the corresponding photoconductor drums 3*a* to 3*d* with the transfer belt 7 therebetween. A high voltage having the polarity opposite to the toner is applied to each of the transfer rollers 6*a* to 6*d*, thereby applying the toner images to the recording sheet. Four kinds of toner images corresponding to the respective colors are superimposed successively on the recording sheet transported by the transfer belt 7.

Thereafter, the recording sheet is transported to the fixing unit 12, and the fixing unit 12 fixes the toner images onto the recording sheet with heat and pressure. A transport switching guide 34 switches the transport path so as to transport the recording sheet with the toner images fixed thereon to the sheet discharge tray 33 or to a sheet transport path 35. The recording sheet transported to the sheet transport path 35 is transported along a sheet transport path 37 by transport rollers 36 and 38, and then transported to the sheet discharge tray 15 by sheet discharge rollers 39.

When the transfer to the recording sheet has been completed, the cleaner units 4*a* to 4*d* collects and remove toner remaining on the photoconductor drums 3*a* to 3*d*. Moreover, the transfer belt cleaning unit 9 collects and removes the toner adhering to the transfer belt 7, so that a sequence of image forming operations is completed.

This embodiment employs a direct transfer system in which a recording sheet is carried on the transfer belt 7 and the toner images formed on the respective photoconductor drums 3*a* to 3*d* are superimposed on the recording sheet. However, the present invention may also be applied to an intermediate transfer type image forming apparatus in which the toner images formed on the respective photoconductor drums 3*a* to 3*d* are transferred onto the transfer belt 7 one upon another and then collectively re-transferred to the recording sheet to form a multi-color image. Needless to say, the same effects as this embodiment can also be obtained.

Figure 2:
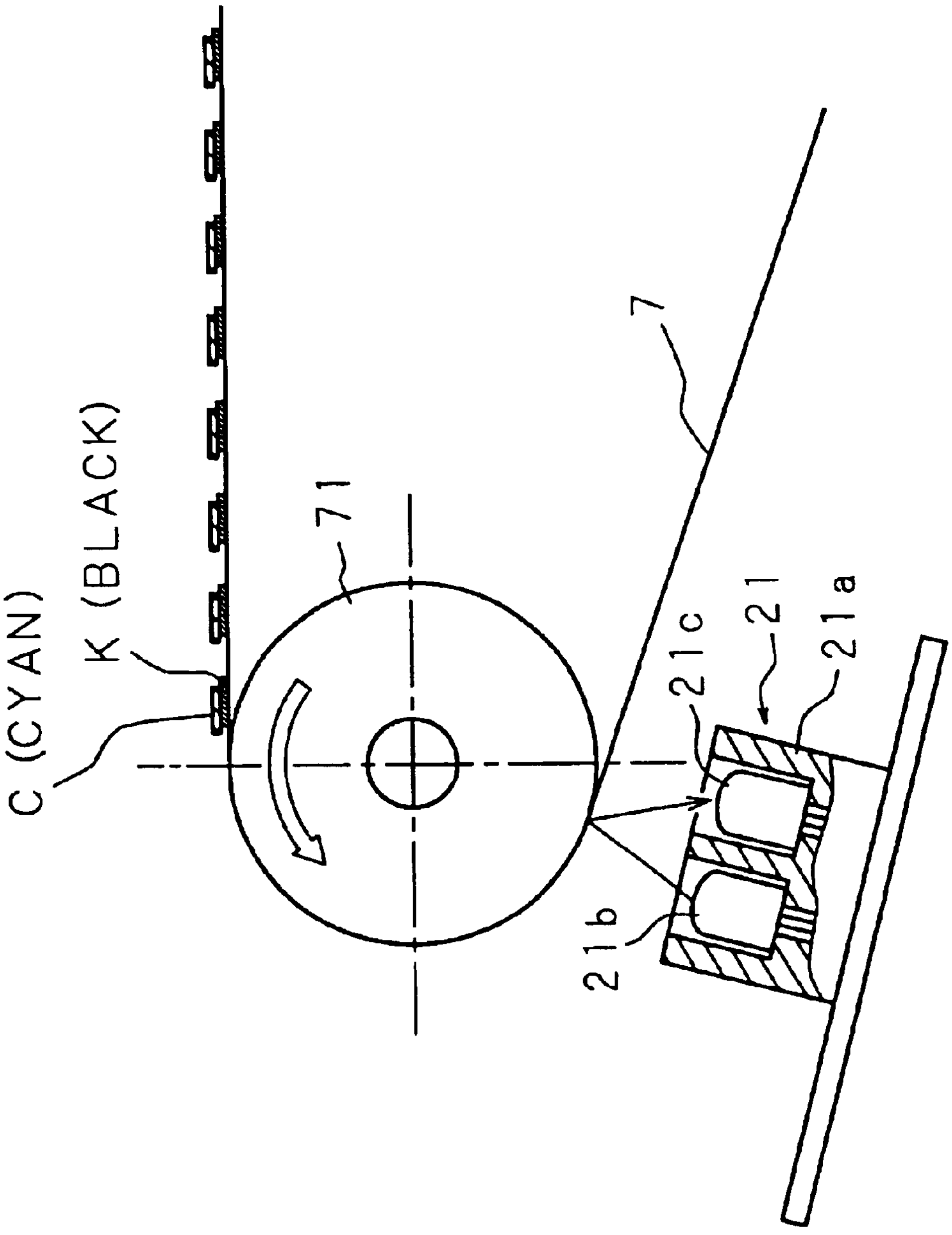
FIG. 2 is a schematic view explaining the operation of a registration detecting sensor.

FIG. 2 is a schematic view showing the operation of the registration detecting sensor 21. The transfer belt 7 is driven and rotated by the transfer belt driving roller 71 provided in the transfer and transport belt unit 8. Therefore, when the reference patch image (for example, black) and the correction patch image (for example, cyan) formed on the transfer belt 7 reach a position facing the registration detecting sensor 21, the registration detecting sensor 21 detects the density of the reference patch image and correction patch image on the transfer belt 7.

The registration detecting sensor 21 comprises a light emitting section 21*b* having LED, and a light receiving section 21*c* having PD (photo diode) or PT (photo transistor), inside a rectangular parallelepiped housing 21*a*. The registration detecting sensor 21 irradiates the transfer belt 7 with light from the light emitting section 21*b*, and detects reflected light from the transfer belt 7 by the light receiving section 21*c*, thereby detecting the density of the reference patch image and correction patch image. Next, based on this detection result, the exposure timings of the light exposure units 1*a* to 1*d* are corrected, and the write timings onto the photoconductor drums 3*a* to 3*d* are corrected. Such corrections are similarly performed for other colors subjected to correction, such as M (magenta) and Y (yellow). Although the reference patch image is black (K) in this embodiment, it may be any one of the colors (C, M, and Y). In this case, the black (K) is subjected to correction.

As shown in FIG. 2, the registration detecting sensor 21 is positioned so that the light emitting section 21*b* and the light receiving section 21*c* are juxtaposed in parallel with the moving direction of the transfer belt 7, but the registration detecting sensor 21 is not limited to this. For example, the registration detecting sensor 21 may be positioned so that the light emitting section 21*b* and the light receiving section 21*c* are perpendicular to the moving direction of the transfer belt 7.

Further, in this embodiment, the processing speed of image formation is set at 100 mm/sec, and the registration detecting sensor 21 performs detection on a sampling cycle of 2 msec.

Figure 3:
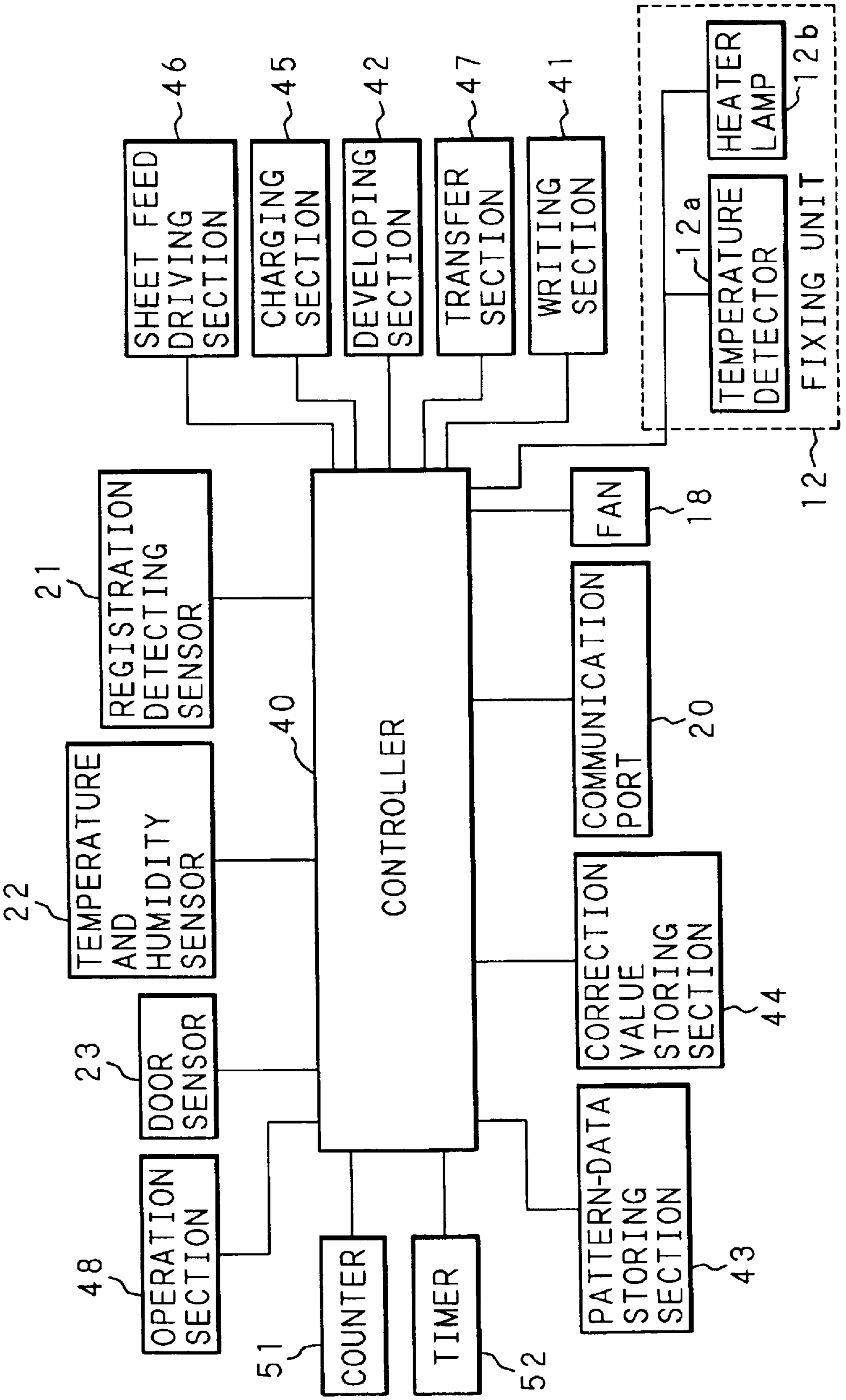
FIG. 3 is a block diagram showing the internal configuration of the image forming apparatus of the present invention.

FIG. 3 is a block diagram showing the internal configuration of the image forming apparatus 100 of the present invention. The image forming apparatus 100 comprises a controller 40 composed of a CPU. The controller 40 is connected through a bus to various hardware such as the fixing unit 12, communication port 20, registration detecting sensor 21, temperature and humidity sensor 22, writing section 41, developing section 42, pattern-data storing section 43, correction value storing section 44, charging section 45, sheet feed driving section 46, transfer section (transfer unit) 47 and operation section 48.

The writing section 41 comprises light exposure units 1*a* to 1*d* and controls the light exposure units 1*a* to 1*d* to form electrostatic latent images corresponding to the inputted image data on the photoconductor drums 3*a* to 3*d*, according to an instruction from the controller 40.

The developing section 42 comprises developing devices 2*a* to 2*d*, and controls the developing devices 2*a* to 2*d* to develop the electrostatic latent images formed on the photoconductor drums 3*a* to 3*d* into a visible images with toner of the respective colors, according to an instruction from the controller 40.

The charging section 45 comprises charging devices 5*a* to 5*d*, and controls the charging devices 5*a* to 5*d* to uniformly charge the surfaces of the corresponding photoconductor drums 3*a* to 3*d* to a predetermined potentials, according to an instruction from the controller 40.

The transfer section 47 comprises the transfer belt 7, transfer belt driving roller 71, transfer belt tension roller 73, transfer belt driven rollers 72 and 74 and transfer rollers 6*a* to 6*d*, and drives the transfer belt driving roller 71 to drive and rotate the transfer belt 7 in a predetermined direction, according to an instruction from the controller 40, thereby transferring the toner images formed on the photoconductor drums 3*a* to 3*d* to the transfer belt 7, or a recording sheet attracted onto the transfer belt 7.

The fixing unit 12 comprises a temperature detector 12*a* and a heater lamp 12*b*, and controls the heater lamp 12*b* to be ON/OFF to have a predetermined temperature; based on a temperature value detected by the temperature detector 12*a*.

The sheet feed driving section 46 comprises the sheet feed tray 10, pickup roller 16 and resist rollers 14, and controls the pickup roller 16 and resist rollers 14 to feed recording sheets placed on the sheet feed tray 10 one by one to the transfer belt 7, according to an instruction from the controller 40.

The operation section 48 comprises various button switches, such as a cursor key and a ten-key, and receives inputs concerning the number of sheets of image formation and an adjustment of density of image formation desired by the user. Moreover, it is possible to give an instruction to execute the color registration adjustment process through this operation section 48.

Image inputting apparatuses, such as a scanner device, a facsimile device and a personal computer, are connected as external devices to the communication port 20 as the need arises. Image data inputted from such an external device is temporarily stored in a graphic memory which is not illustrated in figures, and electrostatic latent images corresponding to the image data stored in the graphic memory is formed on the photoconductor drums 3*a* to 3*d*, according to an instruction from the controller 40.

In addition, pattern data to be used in the color registration adjustment are stored in the pattern-data storing section 43 in advance, and a correction value for misregistration between images of respective colors, which has been obtained by executing the color registration adjustment process, is stored in the correction value storing section 44.

Further, a fan 18, a door sensor 23, a counter 51, a timer 52 and the like are connected to the controller 40. By electrically controlling the fan 18, it is possible to prevent a rise in the temperature inside the image forming apparatus 100. With the door sensor 23, it is possible to monitor opening of a cabinet. The counter 51 counts the number of times the image formation has been executed. The timer 52 measures the time elapsed since the supply of power to the image forming apparatus 100.

Figure 4:
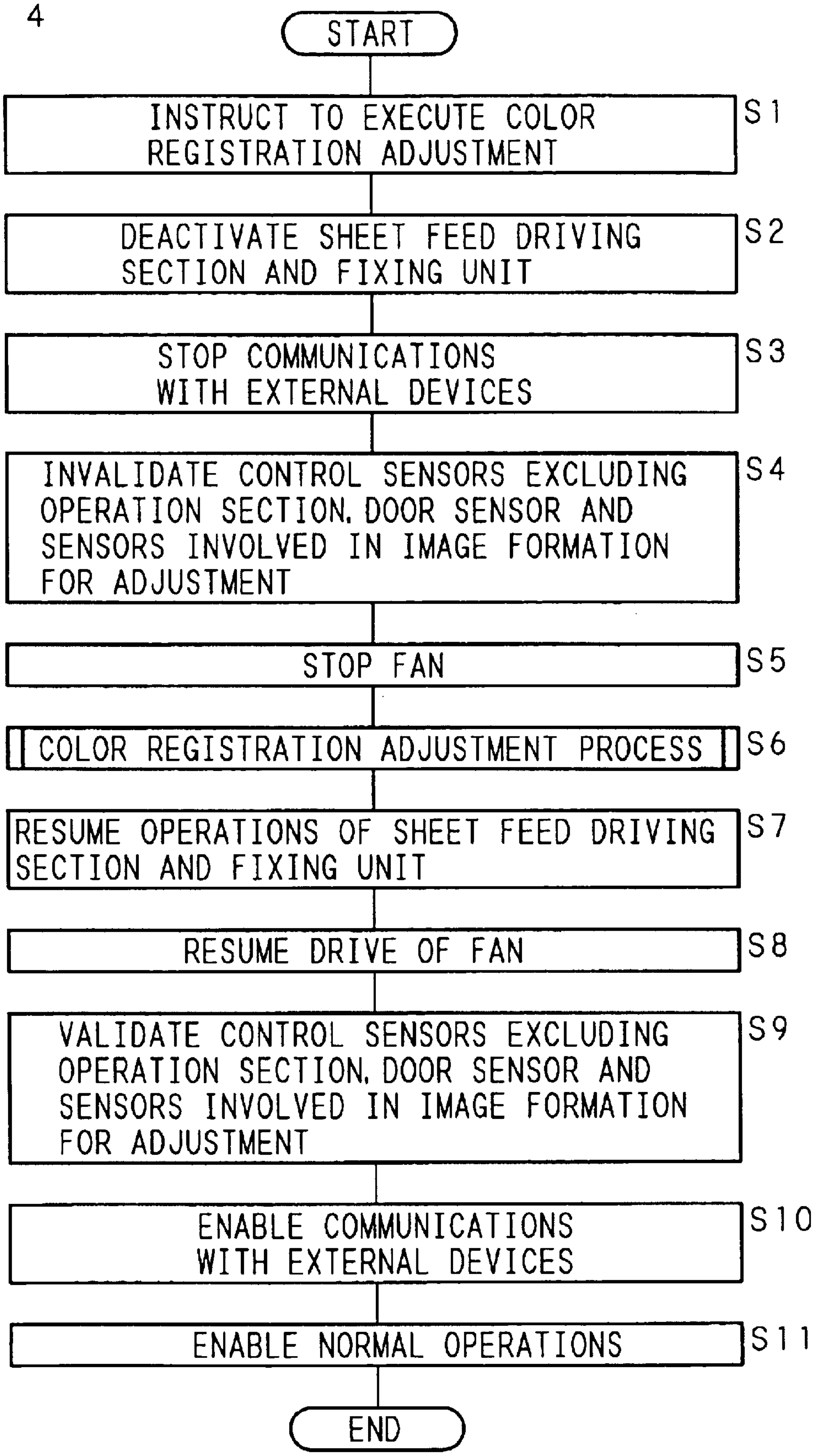
FIG. 4 is a flowchart explaining the operational procedure for executing the color registration adjustment.

FIG. 4 is a flowchart explaining the operational procedure for executing the color registration adjustment. When executing the color registration adjustment, first, the controller 40 outputs an instruction to execute the color registration adjustment (step S1). The execution instruction can be outputted according to an instruction inputted through the operation section 48, or outputted according to an instruction from an external device connected to the communication port 20.

When the instruction to execute the color registration adjustment is outputted from the controller 40, the sheet feed driving section 46 and fixing unit 12 are deactivated (step S2). More specifically, control signals to the sheet feed driving section 46 and fixing unit 12 are not transmitted from the controller 40, and, if the controller 40 receives signals from the sheet feed driving section 46 and fixing unit 12, the controller 40 invalidates these signals. In addition, the temperature detector 12*a* and the heater lamp 12*b* of the fixing unit 12 may also be turned off.

Next, the controller 40 stops communications with the external devices (step S3). If image inputting devices such as a scanner device and a personal computer are connected as the external devices to the communication port 20 of the image forming apparatus 100, the controller 40 does not accept image data or various control signals from these image inputting devices, thereby temporarily stopping communications.

Then, the controller 40 invalidates control sensors, excluding the operation section 48, door sensor 23 and sensors involved in the formation of images for color registration adjustment (step S4), and stops the fan 18 (step S5).

Next, the later-described color registration adjustment process is executed (step S6). When executing the color registration adjustment process, the pattern data stored in the pattern-data storing section 43 are read and successively transferred to the transfer belt 7 so as to detect misregistration of the respective color component images. The pattern data to be used in the color registration adjustment are not necessarily limited to those stored in the pattern-data storing section 43, and may, for example, be obtained from an external device connected to the communication port 20. When obtaining pattern data from the outside, pattern data to be used in the color registration adjustment are accepted before stopping communications with the external device in step S3, and the color registration adjustment is performed according to the accepted pattern data.

When the color registration adjustment process has been completed, the controller 40 resumes the operations of the sheet feed driving section 46 and the fixing unit 12 (step S7), and resumes the drive of the fan 18 (step S8). At this time, all the operations may be started at the same time. However, since a fall in the temperature of the heat roller 31 of the fixing unit 12 is anticipated, the operation of the fixing unit 12 is resumed first, and then the operation of the fan 18 is resumed. More specifically, resuming the accepting of an output signal of the temperature detector 12*a* first and resuming the turning on of the heater lamp of the fixing unit 12 or the operation of the fan 18, according to the received output, are the preferred control to bring about a state in which image formation on a recording sheet is available. Next, the controller 40 validates the control sensors, excluding the operation section 48, door sensor 23 and sensors involved in the formation of images for color registration adjustment (step S9). Further, the controller 40 enables communications with the external devices (step S10), and enables normal operations (step S11).

Thus, by invalidating or stopping the control of driving sources such as the sheet feed driving section 46 and the fan 18 which are not involved in the color registration adjustment, it is possible to shorten the sampling cycle of the registration detecting sensor 21 to 2 ms from a conventional sampling cycle of 4 ms. Consequently, it becomes possible to reduce the amount of images formed for the color registration adjustment to about a half, and save the developer. Moreover, if the amount of images formed is the same as the conventional amount, it is possible to increase the number of samplings by twice, thereby enabling highly accurate detection.

Although an instruction to execute the color registration adjustment is manually given by the user in this embodiment, it may also be possible to measure by the timer 52 the time elapsed since the start of supply of power to the image formatting apparatus 100, and output an instruction to execute the color registration adjustment when a predetermined time has elapsed. It may also be possible to count by the counter 51 the number of times the image formation has been performed, and output an instruction to execute the color registration adjustment when the counted number has exceeded a predetermined number of times. Further, it may be possible to output an instruction to execute the color registration adjustment when the temperature and humidity measured by the temperature and humidity sensor 22 installed inside the image forming apparatus 100 are out of a preset range of temperature and humidity, or when there is an abrupt change in the temperature and humidity.

The following description will explain in detail a color registration adjustment method using the image forming apparatus 100 of the present invention. The color registration adjustment of this embodiment is executed by combining the first through third color registration adjustments.

[First Color Registration Adjustment]

In this embodiment, an explanation is given for the case where a black (K) toner image is used as a reference patch image, a cyan (C) toner image is used as a correction patch image, and the color registration adjustment range is 99 dots (lines) (the start position is 0 dot and the end position is 99 dot) in the moving direction of the transfer belt 7. Note that the colors of toner images to be used as the reference patch image and the correction patch image are not particularly limited, and other colors (for example, magenta and yellow) may be used. Moreover, the color registration adjustment range is not limited to the adjustment range of 99 dots, and may be set to a narrower range or a wider range. Further, the adjustment range may be changed according to a condition. In any case, when the adjustment range is wide, it takes a long time to perform the registration adjustment, whereas, when the adjustment range is narrow, it takes a short time to perform the registration adjustment.

The color registration adjustment performed by the image forming apparatus 100 of this embodiment is carried out by forming, on the transfer belt 7, reference patch images and correction patch images composed of a plurality of lines extending in a direction (hereinafter referred to as the main scanning direction) perpendicular to the moving direction (hereinafter referred to as the sub-scanning direction) of the transfer belt 7.

Figure 5:
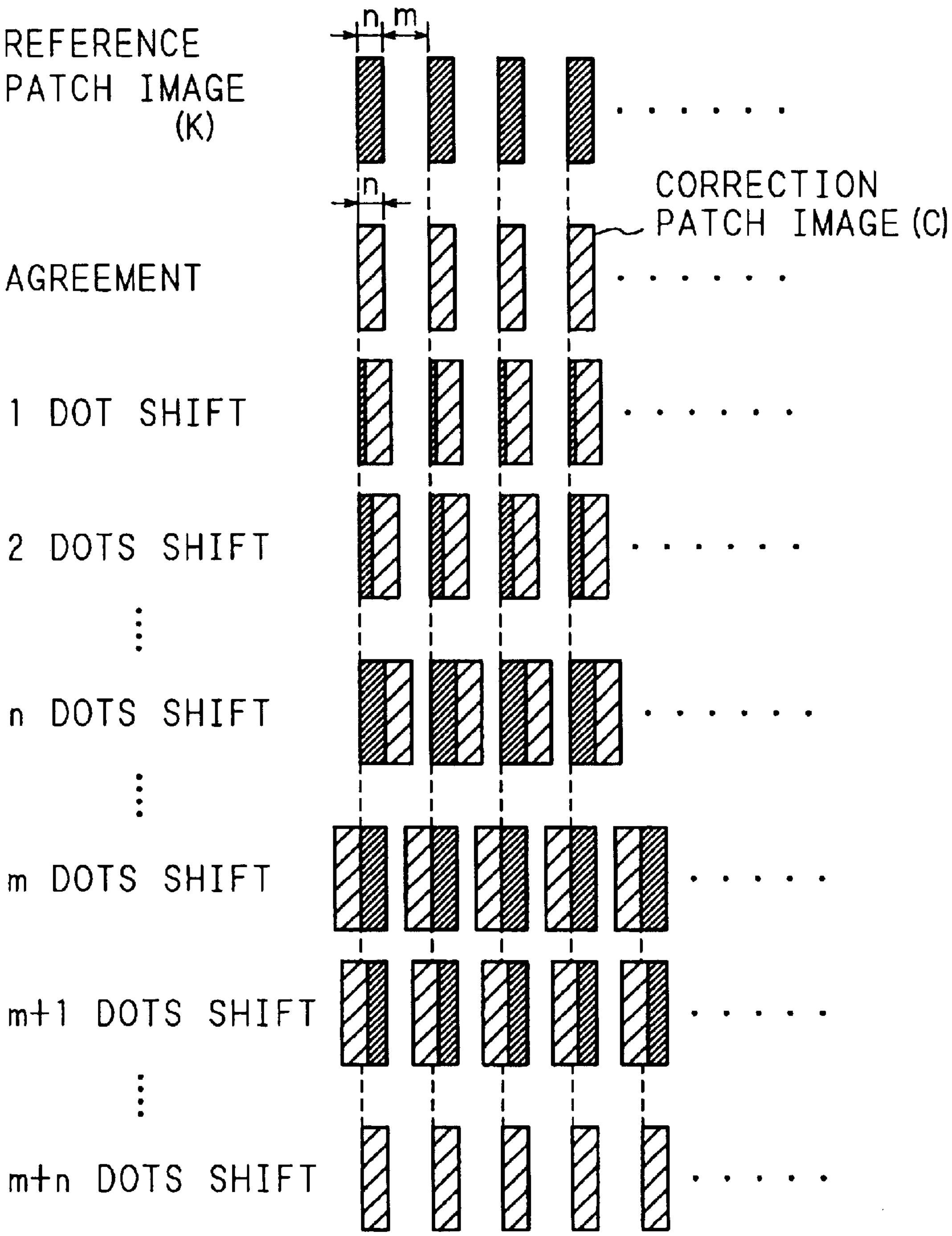
FIG. 5 is a schematic view explaining the positional relation between the reference patch images and the correction patch images.

FIG. 5 is a schematic view explaining the positional relation between the reference patch image and the correction patch image. In the first color registration adjustment, first, as shown in FIG. 5, an image forming pattern is set so that the line width is n dots (for example, 4 dots) and the line spacing between lines is m dots (for example, 7 dots), and then the reference patch images (hereinafter referred to as the reference lines) are formed on the transfer belt 7. After forming the reference lines, correction patch images (hereinafter referred to as the correction lines) having the same line width (n dots) and line spacing (m dots) as the reference lines are further formed on the reference lines.

Since the correction line is formed on the reference line, if the reference line forming position and the correction line forming position perfectly agree with each other, the reference line is completely hidden under the correction line.

Besides, with an increase in the difference between the reference line forming position and the correction line forming position, the area where the reference line appears increases, and the area becomes the maximum when the difference is n dots. If the difference between the reference line forming position and the correction line forming position is in the range from n dots to m dots, the respective lines have the maximum line width. When the correction line forming position is further shifted, the area where the reference line appears decreases, and, when the correction line forming position is shifted by m+n dots, the correction line is perfectly superimposed on the reference line again.

In short, since the ratio between the area where the reference line appears and the area where the correction line appears varies according to the displacement of the correction line with respect to the reference line, it is detected as a change in the density of the images. More specifically, the light emitting section 21*b* of the registration detecting sensor 21 irradiates light on the transfer belt 7 on which both the lines are formed, and the light receiving section 21*c* detects reflected light from both the images and the transfer belt 7. The registration detecting sensor 21 detects a change in the density of the images by detecting the amount of the received light.

Figure 6:
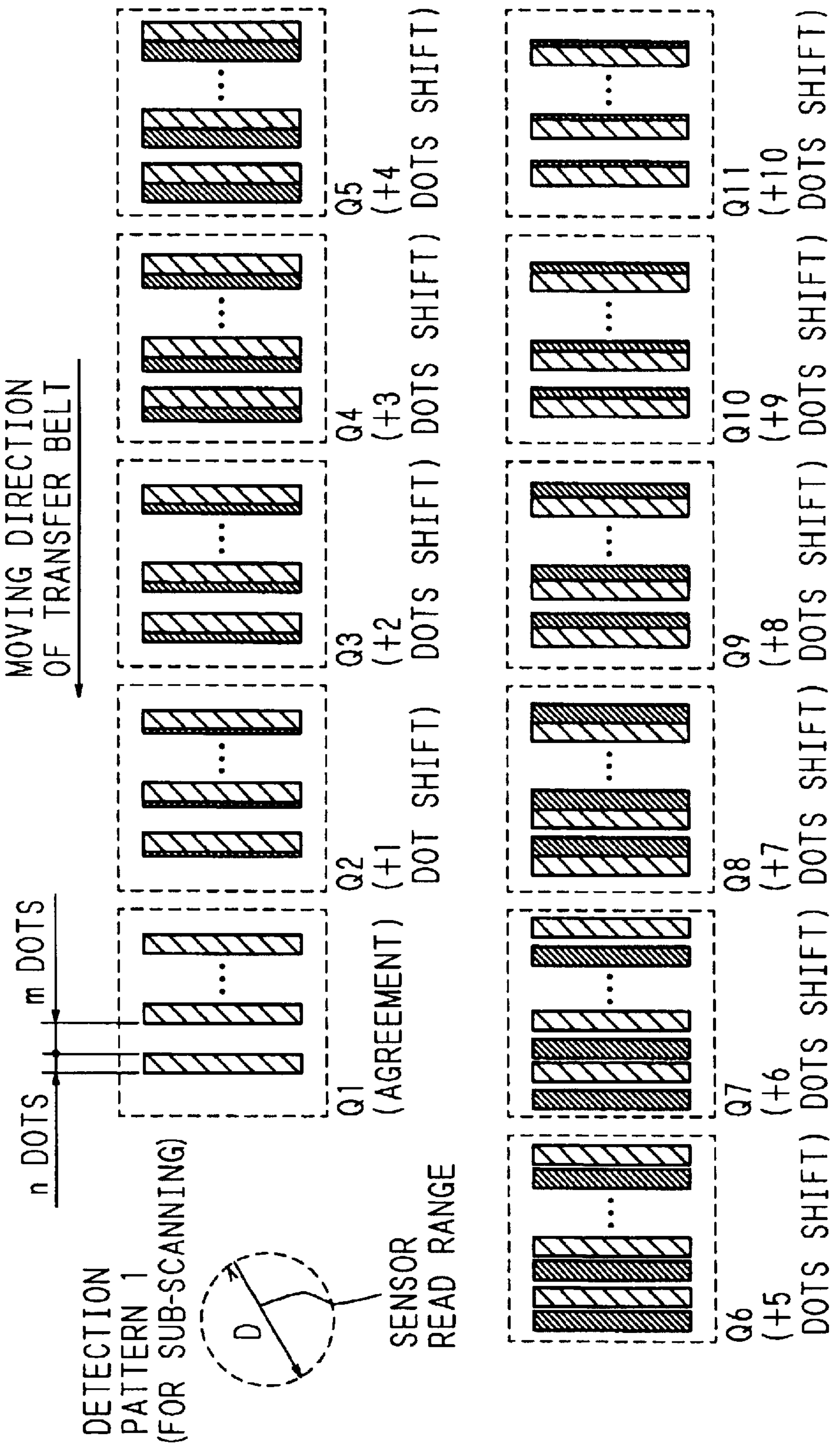
FIG. 6 is an explanatory view explaining the first color registration adjustment for misregistration in sub-scanning direction.

FIG. 6 is an explanatory view explaining the first color registration adjustment for misregistration in sub-scanning direction. As shown in FIG. 6 (the view showing the state of images formed on the transfer belt 7), the registration detecting sensor 21 detects the density of the reference lines and correction lines in a sensor read range D. The sensor read range D of this embodiment has a diameter of about 10 mm, and can average detection errors due to misregistration caused by small vibrations or the like. Several tens to several hundreds of reference lines and of correction lines are formed per a condition to form a combined image (the portion enclosed by the dotted line in FIG. 6), and plural sets of combined images are formed by changing the condition.

As described above, the density of the reference lines and correction lines on the transfer belt 7 varies depending on a superimposed state of the reference lines and correction lines on the transfer belt 7. Specifically, according to the degree of overlapping of the reference line and the correction line, the detected value of reflected light detected by the registration detecting sensor 21 changes. The density detection result of the registration detecting sensor 21 changes according to the total area of the reference lines and the correction lines formed on the surface of the transfer belt 7. When this area is the minimum, i.e., when the reference lines and the correction lines perfectly overlap, the amount of the light which is emitted by the registration detecting sensor 21 and absorbed by the reference lines and correction lines decreases, and the reflected light from the transfer belt 7 becomes the maximum. As a result, the detected value (detection output) of the registration detecting sensor 21 becomes higher. In the case where the transfer belt 7 is transparent, similar detection can be performed by using a transmission type registration detecting sensor as the registration detecting sensor 21, instead of the reflection type registration detecting sensor.

As described above, when the reference lines and the correction lines perfectly overlap, the detected value has an extremal value. In other words, by performing image formation in a condition in which the detected value is a maximum (or a minimum in the case of using a transparent transfer belt as the transfer belt 7), it is possible to produce a state in which the reference lines and the correction lines perfectly overlap. In the first color registration adjustment of this embodiment, by noticing the fact that the detected value of the registration detecting sensor 21 has an extremal value when the reference lines and the correction lines perfectly overlap, the color registration adjustment is performed by finding the extremal value of the detected values. However, it may also be possible to use a method that detects a state in which the reference lines and the correction lines are completely displaced from each other, i.e., detects a minimum value.

In this embodiment wherein the non-transparent black transfer belt 7 is used, the detected value of the registration detecting sensor 21 has the maximum extremal value when the reference lines and the correction lines perfectly overlap. Thus, the superimposed state of the reference lines and the correction lines is changed by shifting the correction lines to be formed on the reference lines at an arbitrary rate, and then the detected values of the registration detecting sensor 21 are obtained to find a maximum detected value for the respective states.

More specifically, as described above, in the case where the reference lines and the correction lines are a plurality of lines with the line width n of 4 dots and the line spacing m of 7 dots between lines, when the reference lines and the correction lines perfectly overlap, the reference lines are perfectly covered with the correction lines as shown by Q1 in FIG. 6. In other words, the registration detecting sensor 21 detects the density of an image composed of repetitions of the line width in which 4 dots of the reference line and 4 dots of the correction line overlap, and the line spacing of 7 dots.

Next, when each correction line is shifted from the reference line forming position in a direction (sub-scanning direction) orthogonal to the main scanning direction by 1 dot, as shown by Q2 in FIG. 6, a misregistration state in which the reference line is not perfectly covered with the correction line will result. In short, the registration detecting sensor 21 detects a line width of 5 dots, including the 4-dot line width of the reference line and the 4-dot line width of the correction line which overlaps the reference line with a shift of 1 dot, and a line spacing of 6 dots. In other words, the registration detecting sensor 21 detects the density of an image composed of repetitions of the line width of 5 dots consisting of the reference line and the correction line, and the line spacing of 6 dots.

Thus, when the correction line is shifted from the Q1 state by 1 dot in the direction (sub-scanning direction) orthogonal to the main scanning direction, the superimposed state of the reference line and correction line changes as shown by Q1 to Q11 in FIG. 6. Then, when the correction line is shifted by +11 dots from the Q1 state shown in FIG. 6, the line width of 4 dots of the correction line and the line spacing of 7 dots repeat, and the state in which the reference line and the correction line perfectly overlap is produced again. In short, the 11-dot misregistration state of the correction line is equal to the state before shifting the correction line, and the same state repeats whenever the correction line is shifted by 11 dots. Therefore, the creation and detection of the reference lines and correction lines are completed within a range from the −5 dots misregistration position to the +5 dots misregistration position (corresponding to the correction values "45" to "55" with respect to the reference line), based on a predetermined state, for example, the center value in a color registration adjustable range (the center value is "50" when the color registration adjustment range is from "0" to "99"). In short, the first color registration adjustment is performed for 11 kinds of combined images so as to enable prediction of a correction value for the exposure timing at which a color component image to be the reference and other color component image subjected to adjustment (correction) are in perfect register.

Figures 7A, 7B, 7C:
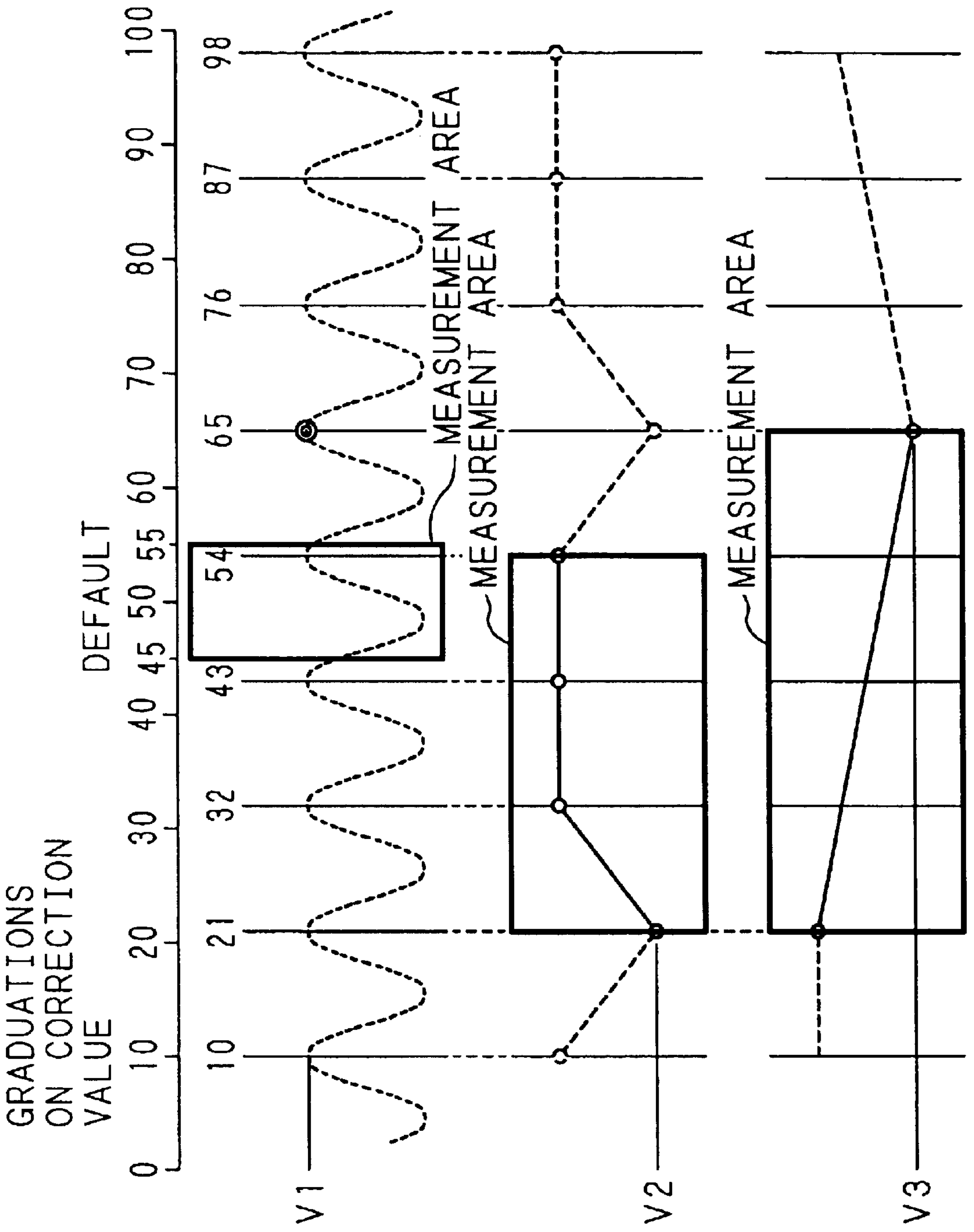
FIGS. 7A through 7C are graphs showing the relation between the detection position of the registration detecting sensor and the detected value.

FIG. 7A is a graph showing the relation between the detection position of the registration detecting sensor 21 and the detected value. When changes in the superimposed state of the reference lines and correction lines are detected in the sensor read range D (in this embodiment, the diameter D=10 mm) of the registration detecting sensor 21 and the detected values are shown in a graph, as shown in FIG. 7A, the state in which the reference line and correction line perfectly overlap, i.e., a point where the detected value is a maximum (a correction value of "54" in this example), is detected as the agreement point by detected value V1. However, there is a possibility that this agreement point is not a true agreement point, and any one of other misregistrations of +11 dots (correction value "65"), +22 dots (correction value "76"); +33 dots (correction value "87"), +44 dots (correction value "98"), −11 dots (correction value "43"), −22 dots (correction value "32), −33 dots (correction value "21"), and −44 dots (correction value "10") may be the true agreement condition. In other words, any one of these nine points is the true agreement condition, and, in this stage, it is only possible to predict candidates of the true agreement point. Therefore, even when the exposure timing of the light exposure units 1*a* to 1*d* for forming the correction line are corrected using a correction value at which the detected value of the registration detecting sensor 21 is a maximum, there is still a possibility that the resulting state is not the state where the reference color component images subjected to adjustment (correction) are perfectly superimposed.

[Second Color Registration Adjustment]

Therefore, in order to find a correction value to be the true agreement paint from the correction value ("54") obtained in the first color registration adjustment and predicted values that can be obtained from this correction value, the second color registration adjustment is performed to narrow down the candidates of the true agreement point for the first time. In this second color registration adjustment, based on the obtained correction value "54", the candidates of the true agreement point are narrowed down from four predicted values including the obtained correction value "54" (for example, "21", "32", "43" and "54"). Here, the four predicted values are not limited to the values mentioned above, and any four successive predicted values may be used. In the second color registration adjustment, based on the timing corresponding to the maximum correction value obtained in the first color registration adjustment, writing onto the photoconductor drums 3*a* to 3*d* is respectively performed by the exposure of the light exposure units 1*a* to 1*d*, and the reference patch images and the correction patch images are formed on the transfer belt 7.

Figure 8:
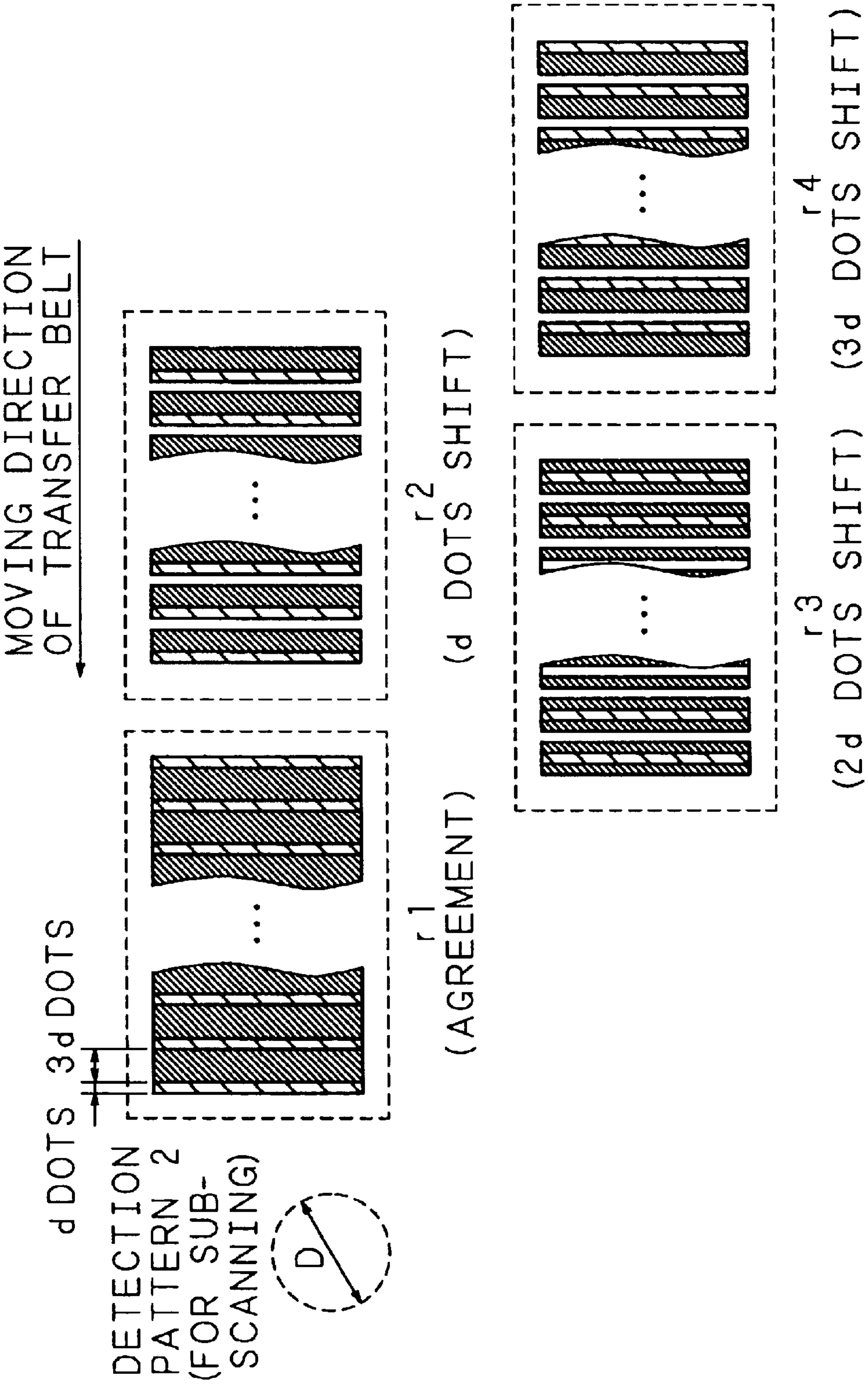
FIG. 8 is an explanatory view explaining the second color registration adjustment for misregistration in sub-scanning direction.

FIG. 8 is an explanatory view explaining the second color registration adjustment for misregistration in the sub-scanning direction. The reference patch image and correction patch image to be formed in the second color registration adjustment are formed using the number d of dots (d=m+n) per pitch of the reference line and correction line of the first color registration adjustment as the unit, and the line spacing of the reference patch image is set to d dots and the line width thereof is set to 3d dots. Besides, the line width of the correction patch image is set to d dots, and the line spacing of the correction patch image is set to 3d dots. In short, the pattern forming pitch of the reference line and the correction line is 4d dots (44 dots).

In the second color registration adjustment, similarly to the first color registration adjustment, the correction patch images are formed while being shifted with respect to the reference patch images by a number of dots equal to the pitch of the reference line and the correction line of the first color registration adjustment, and the detected values of the registration detecting sensor 21 are obtained. More specifically, the correction lines are formed while being shifted by d dots.

In this second color registration adjustment, settings are made so that, when the position of a color component image to be the reference and the position of other color component image subjected to adjustment (correction) perfectly agree with each other, the reference patch image forming position and the correction patch image forming position are completely displaced from each other. Therefore, in the state in which a correction patch image is formed between reference patch images, i.e., the state in which the reference patch image and the correction patch image are continuous (the state without a gap in the sub-scanning direction on the transfer belt 7), a minimum value (detected value V2, the correction value "21") is detected by the registration detecting sensor 21, and this value is found as a correction value to be the agreement point (see FIG. 7B).

On the other hand, when the correction patch image is formed on the reference patch image, an output value increases. The correction value of this state means that the position of the color component image to be the reference and that of the other color component image subjected to adjustment (correction) are displaced from each other, and is not a correction value to be the true agreement point.

Since it can be predicted that the same state will be produced by a shift of 4d dots (44 dots) with respect to the obtained correction value "21", the candidates of the true agreement point can be narrowed down to the correction values "21" and "65".

[Third Color Registration Adjustment]

Furthermore, in order to find which of these two correction values is the true agreement point, the third color registration adjustment is performed. In the third color registration adjustment, based on the correction value ("21") obtained in the second color registration adjustment, a determination is made on the two predicted values including "21" ("21" and "65"). In the third color registration adjustment, based on the timing corresponding to the maximum correction value obtained in the first color registration adjustment, writing onto the respective photoconductor drums 3*a* to 3*d* is performed respectively by the exposure of the light exposure units 1*a* to 1*d*, and the reference patch images and the correction patch images are formed on the transfer belt 7.

Figure 9:
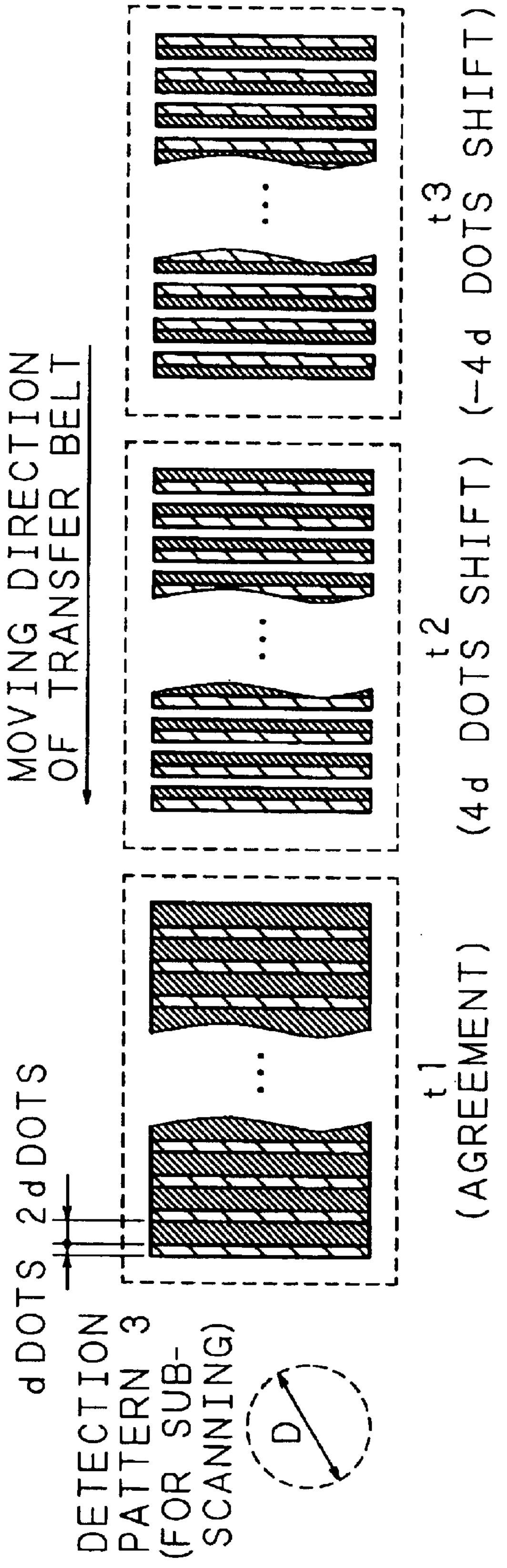
FIG. 9 is an explanatory view explaining the third color registration adjustment for misregistration in sub-scanning direction.

FIG. 9 is an explanatory view explaining the third color registration adjustment for misregistration in the sub-scanning direction. The reference patch image and correction patch image to be formed in the third color registration adjustment use the number d of dots (d=m+n) per pitch of the reference line and correction line of the first color registration adjustment as a standard, and the line spacing of the reference patch image is set to d dots and the line width thereof is set to 2d dots. Besides, the line width of the correction patch image is set to d dots, and the line spacing of the correction patch image is set to 2d dots. In short, the pattern forming pitch of the reference line and the correction line is 3d dots (33 dots).

In the third color registration adjustment, similarly to the second color registration adjustment, the correction patch images are formed while being shifted with respect to the reference patch images by a number of dots equal to the pitch of the reference patch image and the correction patch image of the second color registration adjustment, and the detected values of the registration detecting sensor 21 are obtained. More specifically, the correction lines are formed while being shifted by 4d dots (44 dots) which are the line pitch in the second color registration adjustment.

In the third color registration adjustment, similarly to the second color registration adjustment, settings are made so that, when the position of a color component image to be the reference and the position of other color component image subjected to adjustment (correction) perfectly agree with each other, the reference patch image forming position and the correction patch image forming position are completely displaced from each other. Therefore, in the state in which a correction patch image is formed between reference patch images, i.e., the state in which the reference patch image and the correction patch image are continuous (the state without a gap in the sub-scanning direction on the transfer belt 7), a minimum value (detected value V3, the correction value "65") is detected by the registration detecting sensor 21, and this correction value is found to be the true agreement point (see FIG. 7C).

On the other hand, in the case where the correction patch image is formed on the reference patch image (the correction value "21"), a higher detected value is obtained. The correction value of this state means that the position of the color component image to be the reference and that of the other color component image subjected to correction (adjustment) are displaced from each other, and is not a correction value to be the true agreement point.

As described above, by performing the color registration adjustment in three steps to predict correction values that may be the agreement point and narrow down the predicted candidates of the agreement point, it is possible to efficiently and easily align a reference color component image and a color component image subjected to adjustment (correction) in perfect register in wide range of color registration adjustment, find an exposure timings of the respective light exposure units 1*a* to 1*d* for forming the color component image subjected to correction, and perform the adjustment (correction).

In the above-explained color registration adjustment, the adjustment direction of the reference patch images and correction patch images formed on the transfer belt 7 is the sub-scanning direction. However, since misregistration may also exist in the main scanning direction, reference patch images and correction patch images are formed in a direction orthogonal to the direction of adjustment in the sub-scanning direction, in the same manner as in the color registration adjustment in the sub-scanning direction, and the color registration adjustment is performed.

Figure 10:
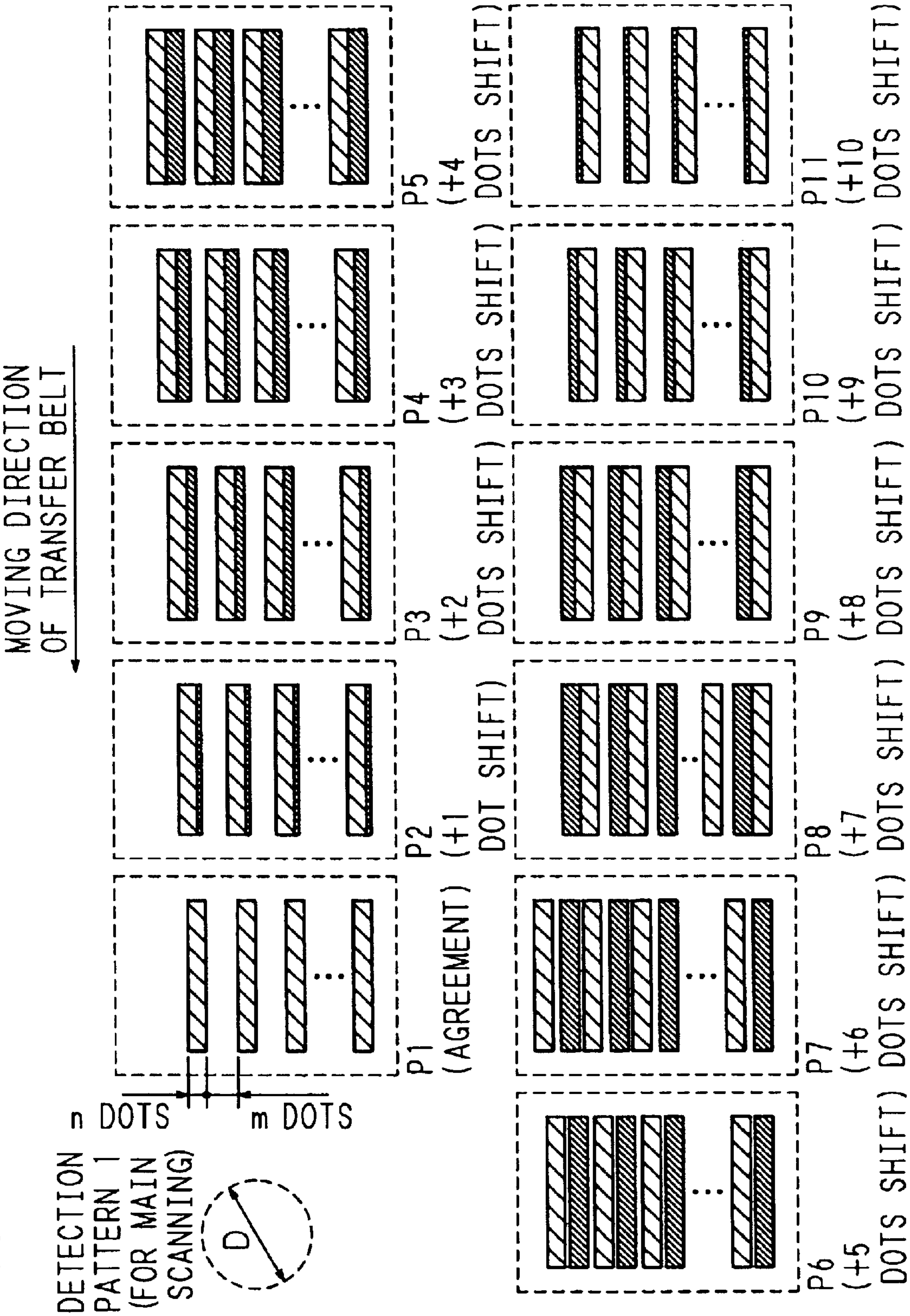
FIG. 10 is an explanatory view explaining a color registration adjustment method for misregistration in main-scanning direction.
Figure 11:
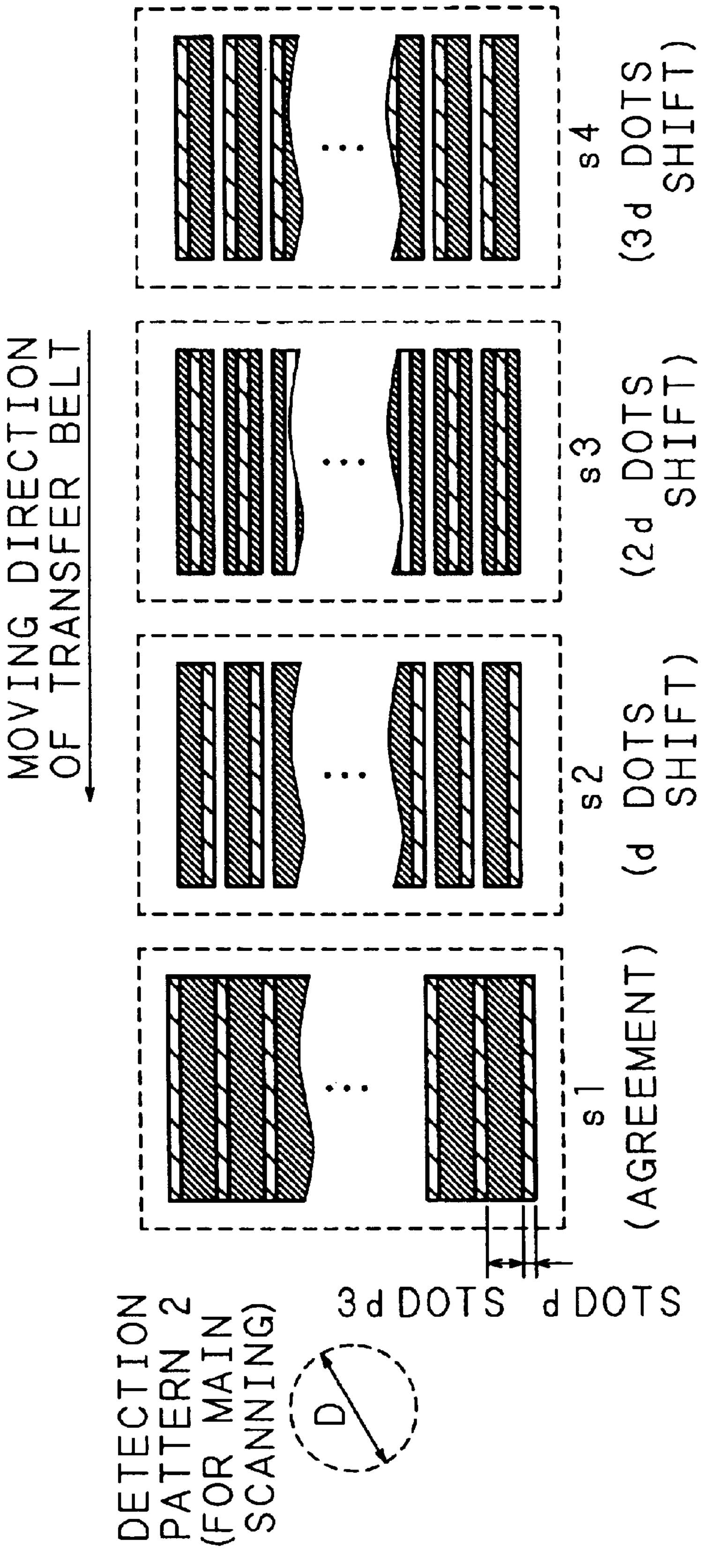
FIG. 11 is an explanatory view explaining a color registration adjustment method for misregistration in main-scanning direction.
Figure 12:
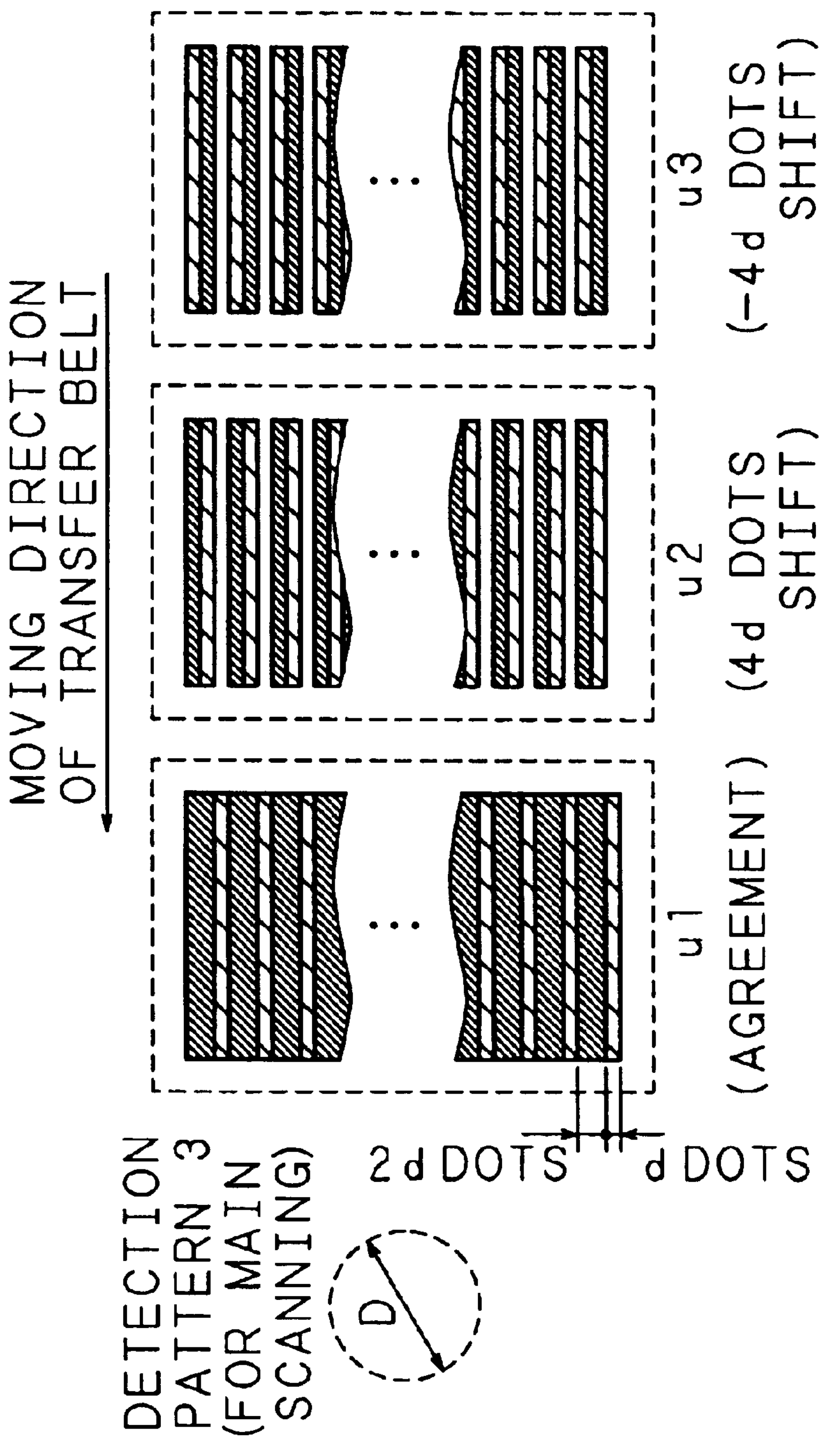
FIG. 12 is an explanatory view explaining a color registration adjustment method for misregistration in main-scanning direction.

FIGS. 10 through 12 are explanatory views explaining a color registration adjustment method for misregistration in the main-scanning direction. In this case, as the first color registration adjustment, first, the correction patch images are formed while being successively shifted with respect to the reference patch images by an amount within the pitch of an image forming pattern as shown in FIG. 10, and a state in which the reference patch images and the correction patch images perfectly overlap is found.

Next, as the second color registration adjustment, with the use of an image forming pattern shown in FIG. 11, the correction lines are formed while being successively shifted by an amount corresponding to the pattern pitch in the first color registration adjustment, and a state in which the reference patch image forming position and the correction patch image forming position do not overlap is found.

Furthermore, as the third color registration adjustment, with the use of an image forming pattern shown in FIG. 12, the color registration adjustment is performed by shifting the correction lines by an amount corresponding to the pattern pitch in the second color registration adjustment, finding an exposure timing at which the color component image to be the reference in the main scanning direction and the color component image subjected to adjustment (correction) are in perfect register, and making an adjustment (correction).

In this embodiment, although the color registration adjustment is performed in both of the main scanning direction and the sub-scanning direction, the color registration adjustment may be performed in either of the main scanning direction and the sub-scanning direction according to need. In this case, it is possible to correct both the misregistration in the sub-scanning direction and that in the main-scanning direction according to need, and obtain excellent image quality.

The above explanation describes in detail the adjustment for one color component subjected to correction in this embodiment, but the same adjustment can also be performed similarly for other color component images subjected to correction. The color components subjected to correction may be adjusted one by one, or all the color components subjected to correction may be adjusted in parallel.

Next, the following description will explain the processing procedure to be executed by the controller 40 during the color registration adjustment.

Figure 13:
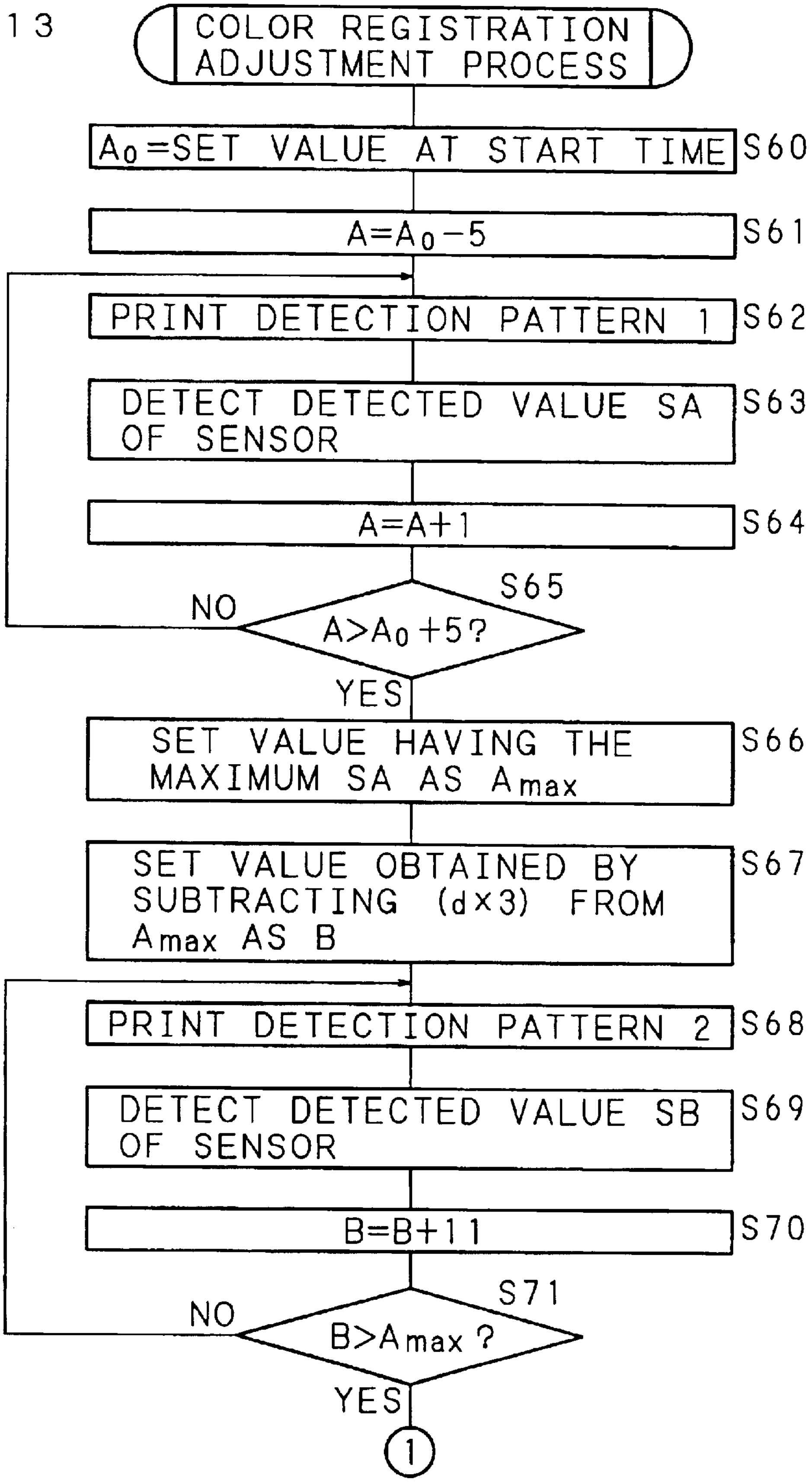
FIG. 13 is a flowchart explaining the processing procedure of a color registration adjustment process.
Figure 14:
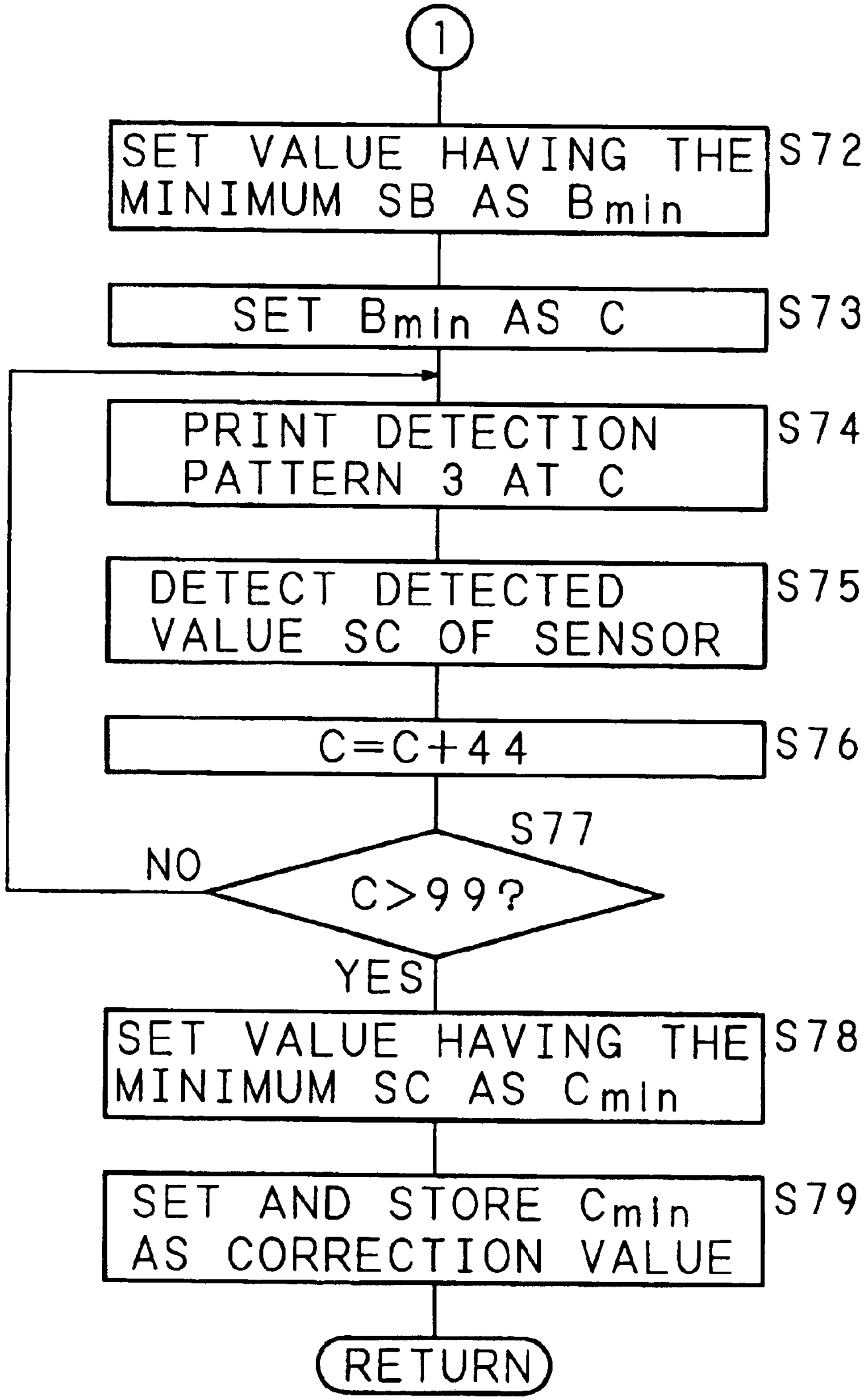
FIG. 14 is a flowchart explaining the processing procedure of the color registration adjustment process.

FIGS. 13 and 14 show a flowchart explaining the processing procedure of the color registration adjustment process. Here, like the above, suppose that the color registration adjustment range is from 0 dot to 99 dot. A detection pattern for use in the first color registration adjustment is set so that the pitch of the patch image is 11 dots, the line width of each of the reference patch image and the correction patch image is 4 dots, and the line spacing is 7 dots. The correction patch images are formed while being successively shifted by 1 dot. A detection pattern 2 for use in the second color registration adjustment is set so that the pitch of the patch image is 44 dots, the line width of the reference patch image is 33 dots, the line spacing of the reference patch image is 11 dots, the line width of the correction patch image is 11 dots, and the line spacing of the correction patch image is 33 dots. The correction patch images are formed while being successively shifted by 11 dots. Further, a detection pattern 3 for use in the third color registration adjustment is set so that the pitch of the patch image is 33 dots, the line width of the reference patch image is 22 dots, the line spacing of the reference patch image is 11 dots, the line width of the correction patch image is 11 dots, and the line spacing of the correction patch image is 22 dots. The correction patch images are formed while successively shifting them by 44 dots.

First, the controller 40 of the image forming apparatus 100 defines an arbitrary position in the color registration adjustment range as a set value $A_0$ at start time (step S60). In general, the center value of the color registration adjustment range (in this embodiment, $A_0$=50) is stored as the default value in a storing section (not shown) of the image forming apparatus 100. Here, the value of $A_0$ means a correction value for the exposure timing of the light exposure unit 1 of the image forming station 80 for forming the correction patch image.

Next, the controller 40 sets a value obtained by subtracting 5 from the value of $A_0$ as A (step S61). Specifically, when the initial value $A_0$ is "50", "45" is set. Then, the above-mentioned detection pattern 1 is printed (step S62). Here, while the reference patch image is formed according to a predetermined timing, the correction patch image is formed according to the correction value "45" of the exposure timing. In other words, the correction patch image (correction line) is formed according to the timing of −5 dots shifted position with respect to the correction patch image forming position of the default value. However, the correction value corresponding to the start position of the first color registration adjustment is not limited to "45", and may be set to any value (0 to 88) except values larger than "88" (99−11=88), according to a condition.

The registration detecting sensor 21 measures the density of the reference patch images and correction patch images on the transfer belt 7, and detects a detected value SA (step S63). Next, the controller 40 adds 1 to the value of A (step S64), and determines whether or not the resulting value of A becomes ($A_0$+5), namely "55" (step S65). In step S65, if the value of A is smaller than ($A_0$+5) (NO in S65), the controller 40 returns the process to step S62, and repeats the steps S62 through S65.

On the other hand, in step S65, if the value of A exceeds ($A_0$+5) (YES in S65), the controller 40 sets a value having the maximum SA among detected values SA, as $A_{max}$ (step S66). In other words, while forming the images by shifting the position of the correction line by 1 dot until the adjustment value (correction value) becomes "45" to "55", the controller 40 performs the operation of detecting the densities of the images. Here, if the result as shown in FIG. 7A is obtained by this first color registration adjustment, the agreement point (temporary agreement point) is $A_{max}$, and the value of A ("54") of this time is set as $A_{max}$.

Next, the controller 40 performs the second color registration adjustment process to narrow down the candidates of the agreement point. In the second color registration adjustment process, first, based on $A_{max}$ ("54") determined in S66, the controller 40 defines a minimum value among four successive values in a range from a value obtained by subtracting a multiple of 11 from $A_{max}$ to a value obtained by adding a multiple of 11 to $A_{max}$, as B. In other words, among the values from ("54"−"44"="10") to ("54"+"44"="98"), four successive values ("21", "32", "43" and "54") are determined, and the minimum value "21" among the four successive values is set as the initial value of B. Thus, in this embodiment, B is determined by the method in which "21" is obtained by subtracting (d×3=33) from $A_{max}$ (step S67).

Next, the controller 40 prints the reference patch images, and the correction patch images on a position corresponding to the correction value of B ("21") (step S68) using the detection pattern 2, and the registration detecting sensor 21 measures the density of an image composed of the reference patch images and correction patch images on the transfer belt 7 and detects a detected value SB (step S69).

Then, the controller 40 updates the correction value by adding the pitch number 11 of the image forming pattern (detection pattern 1) for use in the first color registration adjustment, to the value of B (step S70). In short, the controller 40 sets the value of B as "32". Next, the controller 40 determines whether or not the resulting value of B exceeds the value of $A_{max}$ ("54") (step S71). If it is determined that the value of B is smaller (NO in S71), the controller 40 returns the process to step S68, and repeats the steps S68 through S71. On the other hand, if it is determined that the value of B is larger than the value of $A_{max}$ (YES in S71), the controller 40 finds a minimum value among the detected values SB obtained in step S69 and defines the minimum value as $B_{min}$ (step S72). Here, if the result as shown in FIG. 7B is obtained, the correction value "21" is the minimum value, and thus this value is a candidate for the agreement point. At this time, it is predicted that "65" obtained by adding 4d to "21" is also a candidate for the agreement point.

Next, in order to determine which of these values "21" and "65" is the true agreement point, the third color registration adjustment is performed. First, the controller 40 defines the value of $B_{min}$ as C (step S73). Next, the controller 40 forms the reference patch images, and the correction patch images on a position corresponding to the value of C (correction value "21") by using the detection pattern 3 (step S74). Then, the registration detecting sensor 21 measures the density of an image composed of the reference patch images and correction patch images on the transfer belt 7 and detects a detected value SC (step S75). Next, the controller 40 updates the correction value by adding the pitch number 44 of the image forming pattern (detection pattern 2) for use in the second color registration adjustment to the value of C (step S76). In short, the value of C is set as "65".

Then, the controller 40 determines whether or not the resulting value of C is larger than the maximum value "99" (step S77). If the value of C is smaller (NO in S77), the controller 40 returns the process to step S74, and repeats the steps S74 through S77. On the other hand, if it is determined that the value of C is larger than "99" (YES in S77), the controller 40 finds a minimum value among the detected values SC obtained in step S75, and defines this value as $C_{min}$ (step S78). Here, if the result as shown in FIG. 7C is obtained, "65" having a minimum value is the true agreement point. The "65" is stored in the correction value storing section 44 as the latest correction value. Similarly, for other colors subjected to correction, the controller 40 finds the correction values, and stores the correction values for the colors subjected to correction in the correction value storing section 44 (step S79).

The color registration adjustment explained using the flowchart shown in FIGS. 13 and 14 is an adjustment method for the color registration adjustment performed in the initial stage. When the image forming apparatus 100 is installed in the place of actual use after assembling, the color registration adjustment for the initial stage is performed after replacement of parts, or after maintenance. After the color registration adjustment, the obtained correction value is stored in the image forming apparatus 100, and image formation is performed based on this correction value. Thus, as the color registration adjustment to be performed when starting to use the image forming apparatus 100, the first color registration adjustment, the second color registration adjustment, and the third color registration adjustment must be performed.

Further, after the execution of the initial color registration adjustment, it is rarely the case that there is a large misregistration when performing the registration adjustment prior to image formation, and therefore the second color registration adjustment and the third color registration adjustment may be omitted.

It may also be possible to arrange the color registration adjustment to be performed after a predetermined time has elapsed since the supply of power, or after the number of copies of the image formation has exceeded a predetermined number of sheets. In this case, there hardly is misregistration, and therefore the time required for the color registration adjustment can be significantly shortened by omitting the second color registration adjustment and the third color registration adjustment.

In addition, the color registration adjustment may also be performed when the temperature and humidity sensor 22 installed in the image forming apparatus 100 detects a preset temperature and humidity, or when there is an abrupt change in the temperature and humidity.

Further, after replacement or maintenance of processing units such as photoconductor drums 3*a* to 3*d* and developing units 2*a* to 2*d*, or when there is noticeable misregistration, a user can force the color registration adjustment. In these cases, it is possible to select through the operation section 48 whether all of the first, second and third color superimposition adjustments are to be performed or only the first color registration adjustment is to be performed.

Note that, when a condition for performing the color registration adjustment is met except for the color registration adjustment at the time of supply of power and the forced color registration adjustment, the color registration adjustment is normally performed after completion of the image forming job in progress or before the next image forming job is started, instead of executing the color registration adjustment at once.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image adjustment method of transferring a plurality of color component images by a transfer unit, detecting a superimposed state of the respective transferred color component images with a sensor, and adjusting an image transfer position, based on detected results, to correctly superimpose the respective color component images, comprising the steps of:

accepting information giving an instruction to detect a superimposed state of the respective color component images;

starting detection of a superimposed state of the respective color component images by controlling an operation of the sensor, upon acceptance of the information; and stopping operations other than control of the operation of the sensor and accepting of detection results of the sensor, when detecting the superimposed state.

2. An image forming apparatus for forming an image by superimposing a plurality of color component images by separately transferring each color component, comprising:

a housing capable of being opened and closed;

an image sensor for detecting a superimposed state of the respective transferred color component images;

an open/close sensor for detecting opening and closing of the housing; and a controller capable of performing operations of:

controlling an operation of the image sensor;

accepting information giving an instruction to detect a superimposed state of the respective color component images; and stopping operations other than control of the operation of the image sensor, accepting of detection results of the image sensor and accepting of detection results of the open/close sensor, when the accepting means accepts the information.

3. The image forming apparatus according to claim 2, wherein the image sensor detects a superimposed state of the respective color component images on a predetermined cycle.

4. The image forming apparatus according to claim 3, further comprising a fixing section for fixing the respective transferred color component images onto a recording carrier, wherein the controller is capable of performing further operations of:

supplying power to the fixing section; and stopping the supply of power to the fixing section when transferring the respective color component images and detecting a superimposed state of the respective color component images.

5. The image forming apparatus according to claim 3, further comprising:

a fixing section for fixing the respective transferred color component images onto a recording carrier; and a cooling section provided to lower temperature around the fixing section, wherein the controller is capable of performing further operations of:

supplying power to the cooling section; and stopping the supply of power to the cooling section when transferring the respective color component images and detecting a superimposed state of the respective color component images.

6. The image forming apparatus according to claim 5, wherein the controller stops the supply of power to the cooling section after stopping the supply of power to the fixing section, when transferring the respective color component images and detecting a superimposed state of the respective color component images.

7. The image forming apparatus according to claim 2, further comprising: a fixing section for fixing the respective transferred color component images onto a recording carrier, wherein the controller is capable of performing further operations of:

supplying power to the fixing section; and stopping the supply of power to the fixing section when transferring the respective color component images and detecting a superimposed state of the respective color component images.

8. The image forming apparatus according to claim 2, further comprising:

a fixing section for fixing the respective transferred color component images onto a recording carrier; and a cooling section provided to lower temperature around the fixing section, wherein the controller is capable of performing further operations of:

supplying power to the cooling section; and stopping the supply of power to the cooling section when transferring the respective color component images and detecting a superimposed state of the respective color component images.

9. The image forming apparatus according to claim 8, wherein the controller stops the supply of power to the cooling section after stopping the supply of power to the fixing section, when transferring the respective color component images and detecting a superimposed state of the respective color component images.

10. An image forming apparatus for forming an image by superimposing a plurality of color component images by separately transferring each color component, comprising:

a housing capable of being opened and closed;

accepting means for accepting information giving an instruction to detect a superimposed state of the respective color component images;

image detecting means for detecting a superimposed state of the respective transferred color component images;

control means for controlling an operation of the image detecting means; and open/close detecting means for detecting opening and closing of the housing, wherein operations other than control of the operation of the image detecting means by the control means, accepting of detection results of the image detecting means and accepting of detection results of the open/close detecting means are stopped when the accepting means accepts the information.

11. The image forming apparatus according to claim 10, wherein the image detecting means detects a superimposed state of the respective color component images on a predetermined cycle.

12. The image forming apparatus according to claim 11, further comprising:

fixing means for fixing the respective transferred color component images onto a recording carrier; and means for supplying power to the fixing means, wherein the supply of power to the fixing means is stopped when transferring the respective color component images and detecting a superimposed state of the respective color component images.

13. The image forming apparatus according to claim 11, further comprising:

fixing means for fixing the respective transferred color component images onto a recording carrier;

cooling means provided to lower temperature around the fixing means; and means for supplying power to the cooling means, wherein the supply of power to the cooling means is stopped when transferring the respective color component images and detecting a superimposed state of the respective color component images.

14. The image forming apparatus according to claim 13, further comprising means for performing control to stop the supply of power to the cooling section after stopping the supply of power to the fixing means, when transferring the respective color component images and detecting a superimposed state of the respective color component images.

15. The image forming apparatus according to claim 10, further comprising:

fixing means for fixing the respective transferred color component images onto a recording carrier; and means for supplying power to the fixing means, wherein the supply of power to the fixing means is stopped when transferring the respective color component images and detecting a superimposed state of the respective color component images.

16. The image forming apparatus according to claim 10, further comprising:

fixing means for fixing the respective transferred color component images onto a recording carrier;

cooling means provided to lower temperature around the fixing means; and means for supplying power to the cooling means, wherein the supply of power to the cooling means is stopped when transferring the respective color component images and detecting a superimposed state of the respective color component images.

17. The image forming apparatus according to claim 16, further comprising means for performing control to stop the supply of power to the cooling means after stopping the supply of power to the fixing means, when transferring the respective color component images and detecting a superimposed state of the respective color component images.

* * * * *